US008261218B1

(12) United States Patent
Fung

(10) Patent No.: US 8,261,218 B1
(45) Date of Patent: Sep. 4, 2012

(54) SYSTEMS AND METHODS FOR DETERMINING BENEFICIAL CLOCK-PATH CONNECTION DELAYS

(75) Inventor: Ryan Fung, Mississauga (CA)

(73) Assignee: Altera Corporation, San Jose, CA (US)

(*) Notice: Subject to any disclaimer, the term of this patent is extended or adjusted under 35 U.S.C. 154(b) by 373 days.

(21) Appl. No.: 12/533,948

(22) Filed: Jul. 31, 2009

Related U.S. Application Data

(60) Provisional application No. 61/085,714, filed on Aug. 1, 2008.

(51) Int. Cl.
*G06F 17/50* (2006.01)
*G06F 9/455* (2006.01)

(52) U.S. Cl. ......... 716/108; 716/113; 716/132; 716/134

(58) Field of Classification Search .......... 716/100–101, 716/108, 113, 132, 134, 136, 138
See application file for complete search history.

(56) References Cited

U.S. PATENT DOCUMENTS

| | | | | |
|---|---|---|---|---|
| 6,305,001 B1* | 10/2001 | Graef | ............................ | 716/105 |
| 6,341,363 B1* | 1/2002 | Hasegawa | ..................... | 716/108 |
| 6,907,586 B1* | 6/2005 | Al-Dabagh et al. | .......... | 716/113 |
| 6,910,197 B2* | 6/2005 | Nair | .............................. | 716/114 |
| 6,981,233 B2* | 12/2005 | Chang | ........................... | 716/113 |
| 7,207,020 B1 | 4/2007 | Fung et al. | | |
| 7,254,789 B1 | 8/2007 | Fung et al. | | |
| 7,290,232 B1 | 10/2007 | Fung et al. | | |
| 7,308,664 B1 | 12/2007 | Fung et al. | | |
| 7,398,483 B2* | 7/2008 | Fairbanks | ..................... | 716/102 |
| 7,406,669 B2* | 7/2008 | Lindberg | ....................... | 716/108 |
| 7,472,365 B1* | 12/2008 | Manaker, Jr. | ................. | 716/113 |
| 7,475,297 B1* | 1/2009 | Manaker, Jr. | ................. | 714/700 |
| 7,543,258 B2* | 6/2009 | Kitahara et al. | .............. | 716/113 |
| 7,958,483 B1* | 6/2011 | Alben et al. | .................. | 716/133 |
| 8,001,504 B1* | 8/2011 | Campbell | ..................... | 716/106 |

OTHER PUBLICATIONS

Fung et al., "Slack Allocation and Routing to Improve FPGA Timing While Repairing Short-Path Violations", IEEE, Mar. 28, 2007.
Fung et al., U.S. Appl. No. 11/978,356 entitled "Method and Apparatus for Utilizing Long-Path and Short-Path Timing Constraints in an Electronic-Design-Automation Tool for Routing", filed Oct. 29, 2007.
Fung et al., U.S. Appl. No. 11/857,316 entitled "Optimizing Long-Path and Short-Path Timing and Accounting for Manufacturing and Operating Condition Variability", filed Sep. 18, 2007.
Fung et al., U.S. Appl. No. 11/267,655 entitled "Method and Apparatus for Performing Path-Level Skew Optimization and Analysis for a Logic Design", filed Nov. 4, 2005.

* cited by examiner

*Primary Examiner* — Stacy Whitmore
(74) *Attorney, Agent, or Firm* — Weaver Austin Villeneuve and Sampson LLP

(57) ABSTRACT

Systems and methods for determining clock-path connection delays are described. The systems include a memory configured to store information, and a processor coupled to the memory. The processor determines whether a clock delay applied to a first storage node changes independently of a clock delay applied to a second storage node. The processor determines ideal path delay changes to apply to the first node upon determining that the delay applied to the first node changes independently of the delay applied to the second node. The processor further determines clock path connection delay changes to apply to a group or a collection of the first and second nodes upon determining that the delay applied to the first node cannot or should not change independently of the delay applied to the second node. Such grouping or collections help resolve any conflicts between the first and second nodes and improves processor efficiency by applying the methods to the group or collection instead of each of the individual nodes. Further, the processor considers restrictions based on the granularity of delay options and/or the range of delay options on clock paths.

39 Claims, 15 Drawing Sheets

SYSTEMS AND METHODS FOR DETERMINING BENEFICIAL CLOCK-PATH CONNECTION DELAYS

CROSS-REFERENCE TO RELATED APPLICATIONS

This application claims the benefit of and claims priority under 35 U.S.C. §119(e) to U.S. Provisional Application No. 61/085,714, filed on Aug. 1, 2008, titled "Systems and Methods For Determining Beneficial Clock-path Connection Delays", which is incorporated by reference herein in its entirety for all purposes.

FIELD OF THE INVENTION

The present invention relates to systems and techniques for determining beneficial clock-path connection delays within a target device, such as a programmable logic device (PLD), an application specific integrated circuit (ASIC), or a field programmable gate array (FPGA).

BACKGROUND OF THE INVENTION

To communicate timing performance targets to electronic design automation (EDA) tools for a field programmable gate array (FPGA), a designer specifies timing constraints, such as, clock period constraints, input/output setup times (IO $T_{SETUP}$), and input/output hold times (IO $T_{HOLD}$). Based on these timing constraints, these EDA tools attempt to generate design implementations which satisfy the designer's performance targets. The EDA tools also report whether the specified timing constraints have been satisfied so the designer can take measures, if necessary, to try to improve the design implementation. For example, the designer may change a set of EDA tool settings on the EDA tool.

Usually, the FPGA includes multiple registers including a source register and a destination register, and at least one clock source. The source and destination registers are connected to each other via a register-to-register path. A minimum clock period for the register-to-register path in the design is primarily a function of three delays including a maximum path delay between the source register and the destination register, a maximum path delay from the clock to the source register, and a minimum path delay from the clock to the destination register. A difference between the maximum path delay from the clock to the source register and the minimum path delay from the clock to the destination register is referred to as clock skew for the two respective registers. Minimizing the maximum path delay between the source and destination registers to minimize the clock period is the focus of most EDA optimization.

The EDA tools often ignore the clock skew between the registers during optimization because clock signals are distributed on low-skew routing resources or networks. However, some routing resources or networks may not have low skew in which case the clock skew cannot be ignored.

Further, the designer manually may repair design implementations of the FPGA by skewing clock signals to achieve a desired timing margin. This can be a difficult and time consuming process. The designer may have to figure out a desirable skew solution that can be tricky and tedious with ever growing design size of the FPGA. Also, the designer may have to figure out how to implement that skew solution using the available FPGA hardware. That can also be tricky given the complexity of the clocking logic topologies common in the FPGA. Finally, the designer may manually insert logic into the FPGA, and adjust placement and/or routing of the design implementation, which can also be very challenging given FPGA complexity and growing design sizes.

SUMMARY OF THE INVENTION

To automatically optimize clock skew in a field programmable gate array (FPGA) to better satisfy timing constraints, the techniques described herein determine a feasible set of clock-path connection delays by considering logic on or the topology of clock paths, granularity of a set of delay options on the clock paths, and a range of delay options on the clock paths.

In one aspect, a processor performs the techniques described herein. The processor determines whether a delay of a connection on a first clock-path feeding a first node that may be a register changes independently of a delay of a connection on a second clock-path feeding a second node that may be another register. Processor further determines a first set of ideal path delay changes to apply to the first node upon determining that the first clock-path connection delay changes independently of the second clock-path connection delay, or a set of clock path delay changes to apply to a group of the first and second nodes or a collection of the first and second nodes upon determining that the first clock-path connection delay cannot change independently of the second clock-path connection delay. In determining whether the first clock-path connection delay changes independently of the second clock-path connection delay, the processor considers the logic on the clock paths.

DESCRIPTION OF THE DRAWINGS

The systems and techniques for determining beneficial clock-path connection delays may best be understood by reference to the following description taken in conjunction with the accompanying drawings, which illustrate specific embodiments of the systems and techniques.

DETAILED DESCRIPTION OF PARTICULAR EMBODIMENTS

Reference will now be made in detail to some specific examples of the systems and techniques for determining beneficial delays for clock-path connections including the best modes contemplated by the inventor for carrying out the systems and techniques. Examples of these specific embodiments are illustrated in the accompanying drawings. While the systems and techniques are described in conjunction with these specific embodiments, it will be understood that it is not intended to limit the systems and techniques to the described embodiments. On the contrary, it is intended to cover alternatives, modifications, and equivalents as may be included within the spirit and scope of the systems and techniques as defined by the appended claims.

For example, the techniques of the systems and techniques will be described in the context of programmable chips. However, it should be noted that the techniques of the systems and techniques can be applied to a variety of devices. In the following description, numerous specific details are set forth in order to provide a thorough understanding of the systems and techniques. The systems and techniques may be practiced without some or all of these specific details. In other instances, well known process operations have not been described in detail in order not to unnecessarily obscure the systems and techniques.

Figure 1:
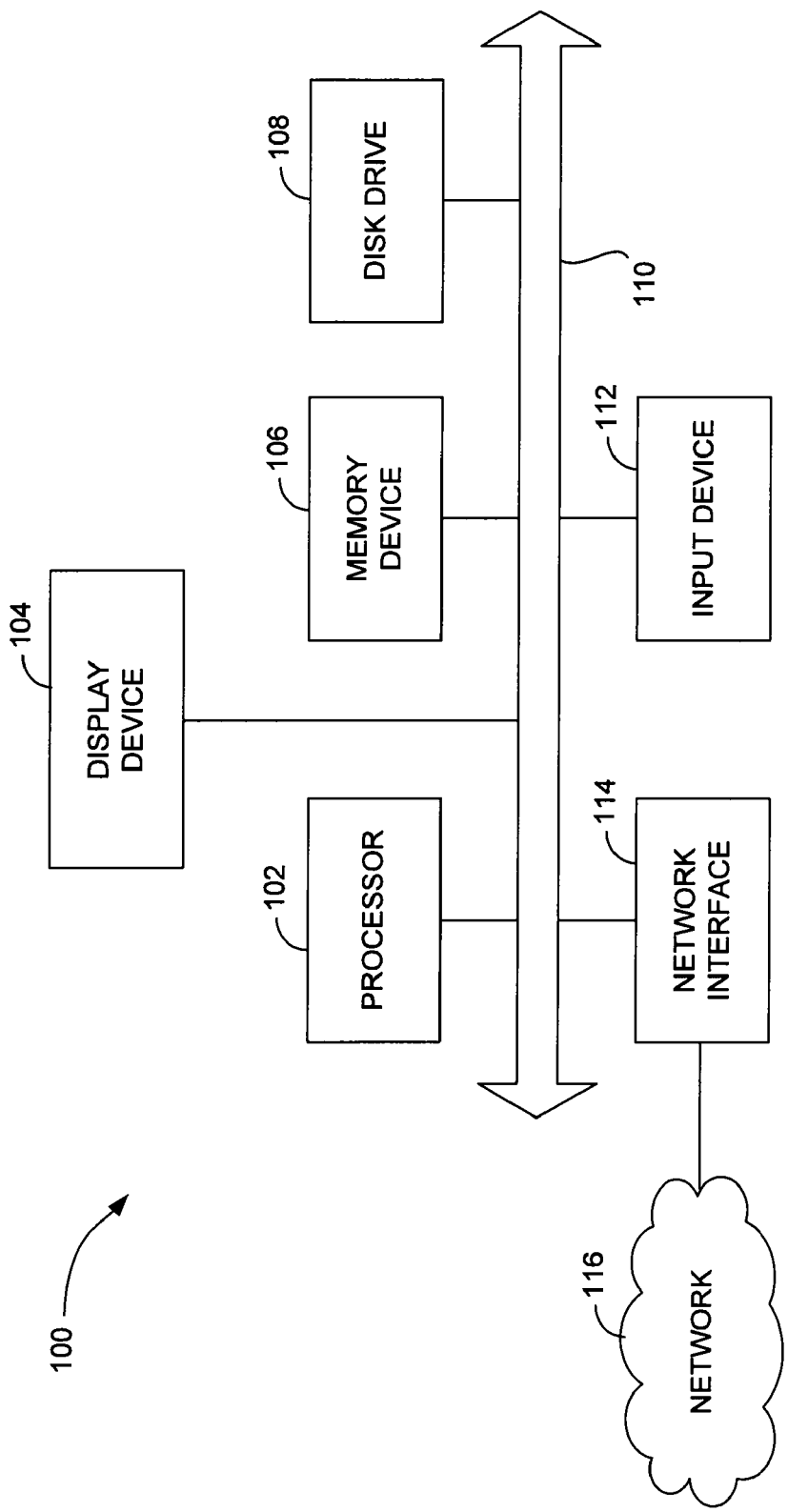
FIG. 1 is a block diagram of a particular embodiment of a system for determining beneficial delays for clock-path connections.

FIG. 1 is a block diagram of a particular embodiment of a system 100 for determining beneficial delays for clock-path connections. System 100 includes a processor 102, a display device 104, a memory device 106, a disk drive 108, a bus 110, an input device 112, and a network interface 114. Processor 102, display device 104, memory device 106, disk drive 108, input device 112, and network interface 114 are interconnected via bus 110. Input device 112 may be a computer mouse, a trackball, a track pad, a graphics tablet, a touch screen, and/or other wired or wireless input device that allows a user to create or select graphics, objects, icons, and/or text appearing on display device 104. Network interface 114 enables wired or wireless communication with a network 116, such as a local area network (LAN), a wide area network (WAN), for example the Internet, and/or a virtual network, for example a virtual private network (VPN). Network interface 114 may be a network interface card (NIC) or a modem enabling system 100 to communicate information with network 116. Display device 104 may be a cathode ray tube (CRT), a liquid crystal display (LCD), an electroluminescence (EL) display, or a light emitting diode (LED) display. As used herein, the term processor is not limited to just those integrated circuits referred to in the art as a processor, but broadly refers to a microcontroller, a microcomputer, a programmable logic controller, an application specific integrated circuit, and other programmable circuits.

A computer-readable medium is inserted into disk drive 108. Examples of the computer-readable medium include a floppy disk, a compact-disc read-only memory (CD-ROM), and a digital versatile disc read-only memory (DVD-ROM). Memory device 106 includes a random access memory (RAM), a battery-backed volatile memory, a battery-backed nonvolatile memory, a flash memory, and/or a read-only memory. The techniques, described herein, for determining beneficial clock-path connection delays are stored on the computer-readable medium and/or in memory device 106 and are executed by processor 102.

Figure 2:
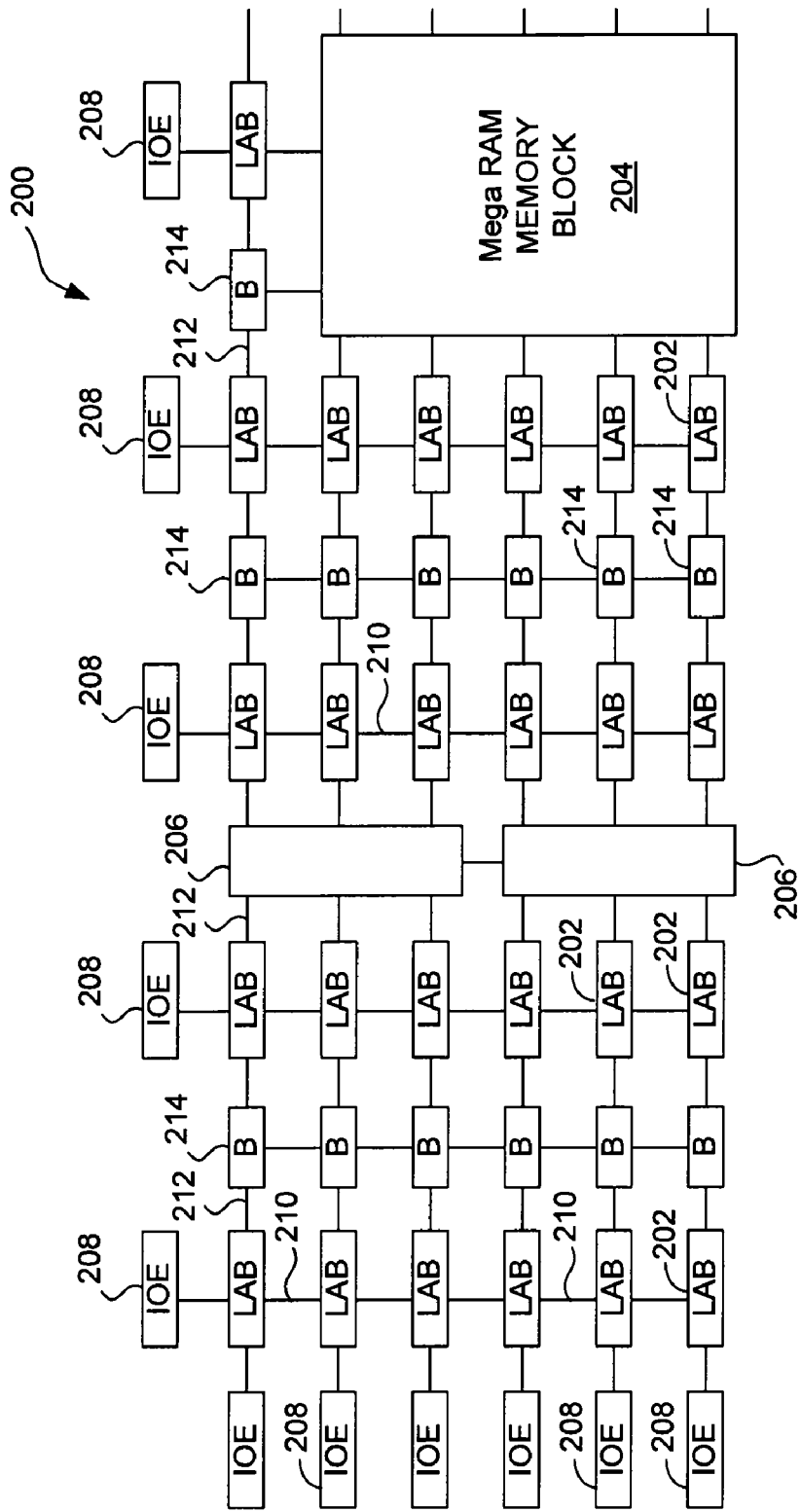
FIG. 2 is a block diagram of an embodiment of a programmable logic device (PLD) that is configured by using the system of FIG. 1.
Figure 3:
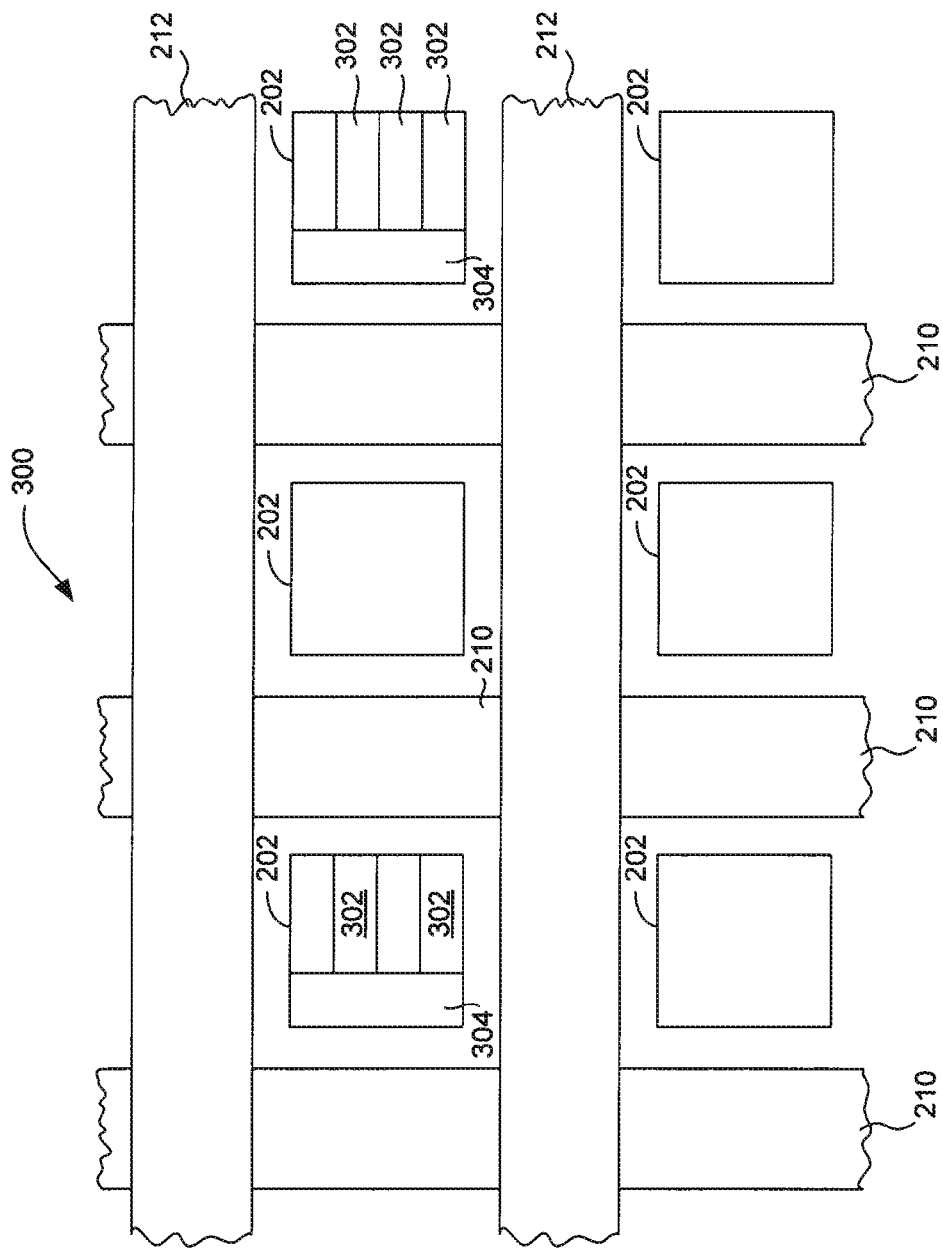
FIG. 3 is a block diagram of an embodiment of a portion of the PLD.

FIG. 2 is a block diagram of an embodiment of a programmable logic device (PLD) 200 that is configured by using system 100 of FIG. 1, and FIG. 3 is a block diagram of an embodiment of a portion 300 of PLD 200. PLD 200 includes a two-dimensional array of programmable logic array blocks (LABs) 202 that are interconnected by a network of a set of column interconnects 210 and a set of row interconnects 212 of varying length and speed. For the purpose of avoiding clutter in FIG. 2, not all LABs are numbered 202. LABs 202 include multiple logic elements (LEs) 302 (shown in FIG. 3). PLD 200 also includes a distributed memory structure including a set of RAM blocks of varying sizes provided throughout the array. The RAM blocks include, for example, a Mega-RAM block 204. PLD 200 further includes a set of digital signal processing (DSP) blocks 206 that can implement, for example, multipliers, add features, and/or subtract features. A set of input/output (I/O) elements (IOEs) 208 located around the periphery of PLD 200 support numerous single-ended and differential I/O standards. PLD 200 further includes a set of buffers (Bs) 214 that connect LABs 202. Buffers 214 may be used to store data that is transferred between LABs 202.

Referring to FIG. 3, PLD 200 includes a plurality of sets 304, and each set 304 includes a set of LAB lines of LAB 202. LEs 302 of LAB 202 are connected with each other via set 304 of LAB lines. PLD 200 further includes a set of registers, which are located within at least one DSP blocks 206, within at least one IOE 208, and/or within at least one LAB 202. PLD 200 further includes a set of look-up tables (LUTs) within LABs 202. Moreover, gates, such as AND gates and OR gates, and/or a set of ROM blocks may be located within LABs 202.

Figure 4:
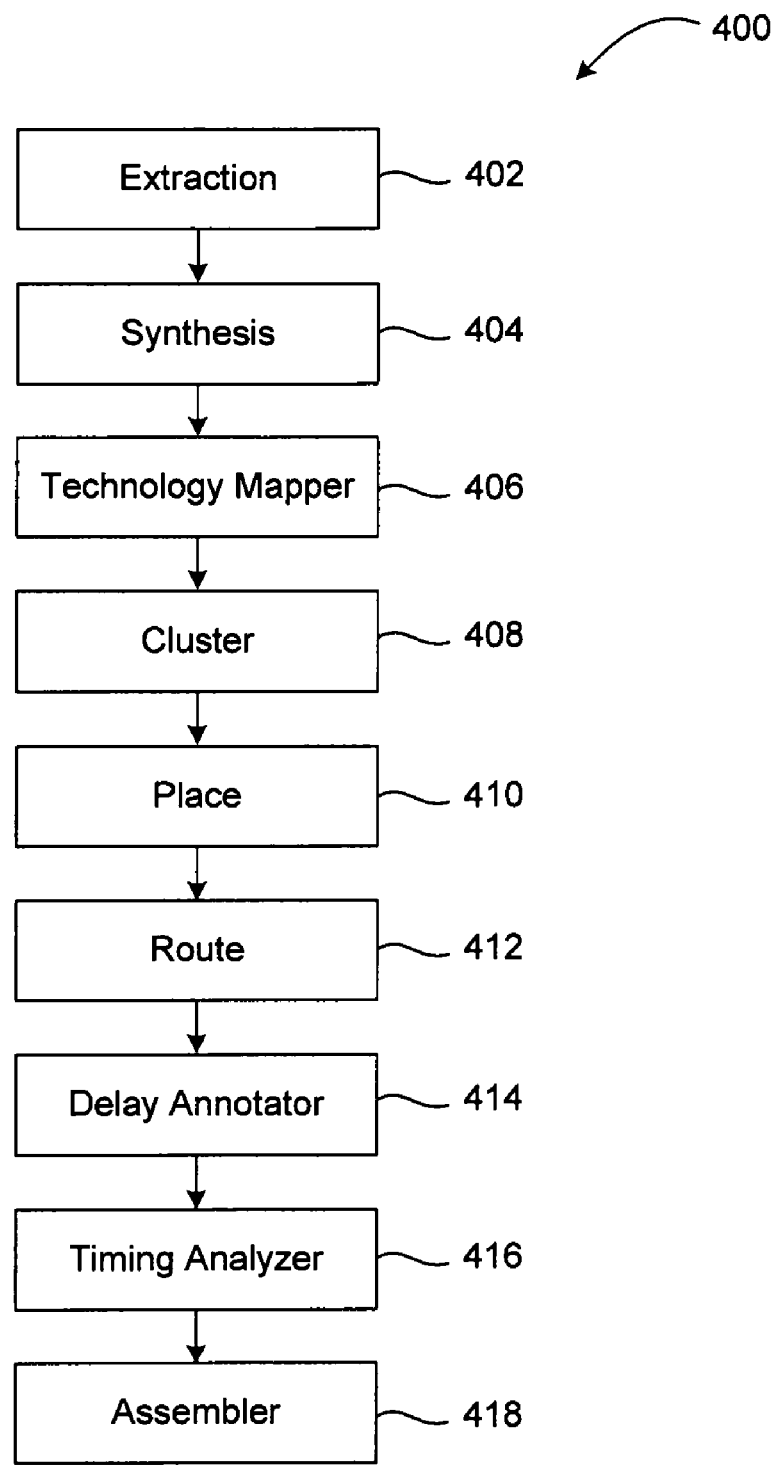
FIG. 4 illustrates a set of phases of a particular embodiment of a compilation technique suitable for configuring and implementing the PLD of FIG. 2.

FIG. 4 illustrates a set of phases of a particular embodiment of a compilation technique 400 used to configured PLD 200. Compilation technique 400 is stored in the computer-readable medium and is executed by processor 102. Compilation technique 400 converts a description, expressed for example in a hardware description language (HDL), provided by the user into a programmable device configuration used to configure PLD 200 (FIG. 2). During an extraction phase 402 of compilation technique 400, processor 102 converts the user's description into a register transfer layer description.

Further, during a synthesis phase 404 of compilation technique 400, processor 102 converts the register transfer layer description of the user's description into a set of logic gates. During a technology mapping phase 406, processor 102 maps the set of logic gates into a set of atoms, which are irreducible constituents of the user's description. In a particular embodiment, the atoms correspond to sets of logic gates and other components of the user's description matching a set of capabilities of LEs 302 (FIG. 3) of PLD 200 (FIG. 2) or other functional blocks of the PLD 200. The user's description may be converted into any number of different sets of atoms, depending upon the underlying hardware of the PLD 200 used to implement the user's description.

During a cluster phase 408 of compilation technique 400, processor 102 accumulates related atoms together into clusters. During a place phase 410, processor 102 assigns the clusters of atoms to locations on PLD 200 (FIG. 2). Further, during a route phase 412 of compilation technique 400, processor 102 determines a configuration of a configurable switching circuit of PLD 200 (FIG. 2) used to connect the atoms implementing the user's description.

During a delay annotator phase 414 of compilation technique 400, processor 102 determines a set of clock delays and data delays for the set of atoms and their associated connections in the configurable switching circuit. During a timing analysis phase 416 of compilation technique 400, processor 102 determines whether the implementation of the user's description in the PLD 200 (FIG. 2) meets a set of long-path constraints and a set of short-path constraints by using a timing graph of PLD 200 (FIG. 2).

Further, during an assembler phase 418 of compilation technique 400, processor 102 generates configuration information specifying the configuration of the PLD 200, including the configuration of each of LEs 302 of PLD 200, and the configuration of the configurable switching circuit used to connect the LEs 302. During assembler phase 418, processor 102 writes the configuration information to a configuration file, which can then be used to configure PLD 200 (FIG. 2) to implement the user's description. The configuration file may be stored on the computer-readable medium and can be executed by processor 102.

Figure 5:
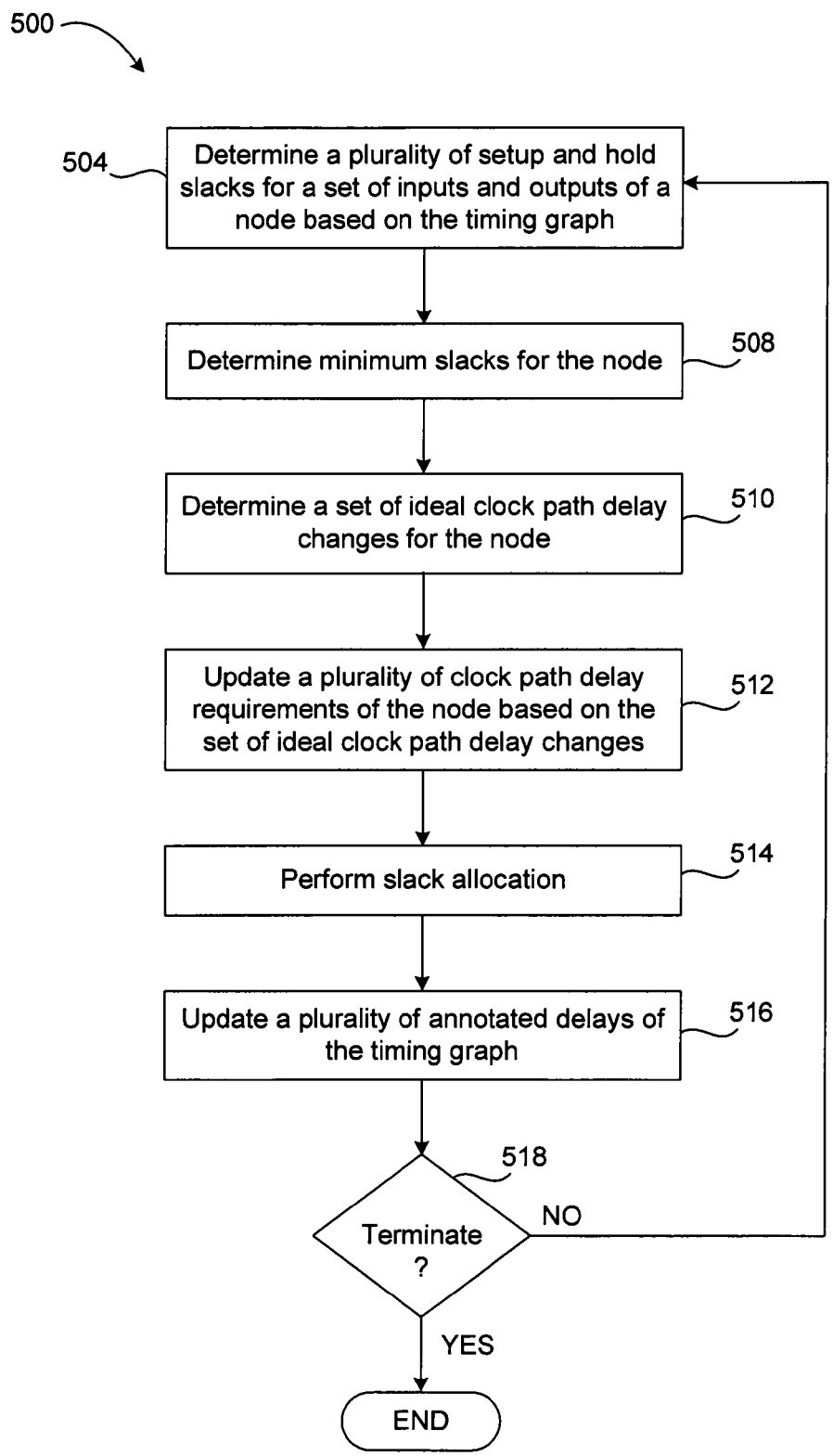
FIG. 5 is a flowchart of an embodiment of a technique for determining beneficial delays for clock-path connections.
Figure 6:
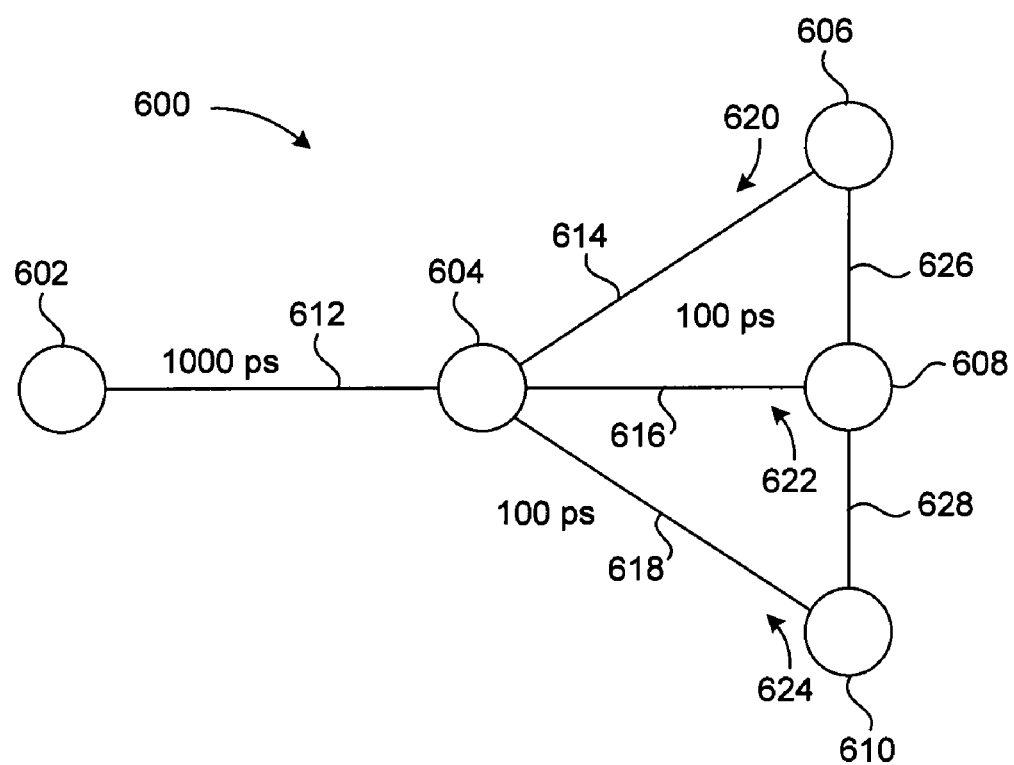
FIG. 6 shows an embodiment of a timing graph used to explain the technique of FIG. 5.
Figure 7:
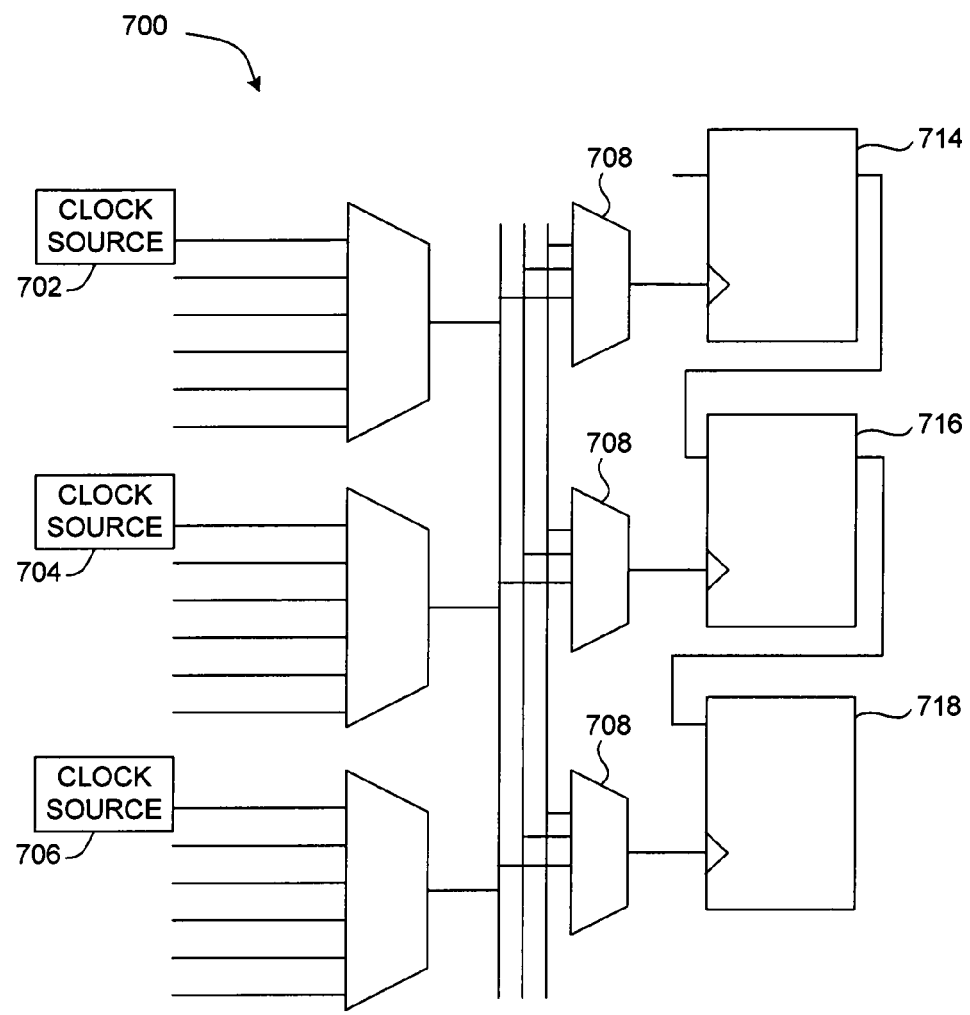
FIG. 7 is an embodiment of a system corresponding to the timing graph of FIG. 6.

FIG. 5 is a flowchart of an embodiment of a technique 500 for determining beneficial delays for clock-path connections, FIG. 6 shows an embodiment of a timing graph 600 for determining beneficial delays for clock-path connections, and FIG. 7 is an embodiment of a system 700 corresponding to the timing graph 600.

Processor 102 generates timing graph 600 of FIG. 6 including a set of annotated clock connection delays, which are minimum achievable clock connection delays on a set of clock paths. For example, processor 102 generates timing graph 600 to represent an example configuration of system 700 (FIG. 7). Timing graph 600 includes a node 602, a node 604, a node A (606), a node B (608), and a node C (610). Node 602 represents any one of a set of clock sources 702, 704 and 706, of system 700 that supplies a clock signal to node 604. Each clock source 702, 704 and 706 may be a crystal oscillator or a crystal oscillator connected to a phase-locked loop. Node 602 drives node 604. For example, at a time, any of clock sources 702, 704 and 706 drives a multiplexer 708 of system 700. Node A represents a register A (714) of system 700, node B represents a register B (716) of system 700, and node C represents a register C (718) of system 700. A register may be a D flip-flop, a JK flip-flop, or any other type of storage element. Node 604 represents multiplexer 708. System 700 is located within PLD 200. For example, register A, register B, and/or register C are located within at least one LAB 202, at least one DSP block 206, and/or at least one IOE 208.

Node 602 and node 604 are connected by a clock-path connection 612 of timing graph 600, node A and node 604 are connected by a clock-path connection 614 of timing graph 600, node B and node 604 are connected by a clock-path connection 616 of timing graph 600, and node C and node 604 are connected via a clock-path connection 618 of timing graph 600. A clock path 620 is formed by clock-path connection 612 and clock-path connection 614. A clock path 622 is formed by clock-path connection 612 and clock-path connection 616. A clock path 624 is formed by clock-path connection 612 and clock-path connection 618. Each clock-path connection has a clock-path connection delay, which is a propagation delay of a clock signal supplied via the clock-path connection. A clock-path delay of a clock path is a sum of clock-path connection delays of a set of clock-path connections of the clock path. A data output of node A is connected to a data input of node B via a data connection 626 of timing graph 600 and a data output of node B is connected to a data input of node C via a data connection 628 of timing graph 600.

Upon generating timing graph 600 or receiving the timing graph as an input, processor 102 determines 504 a set of minimum setup slacks and minimum hold slacks for a set of inputs, such as one or more inputs, and a set of outputs, such as one or more outputs, of each register of system 700 by performing a timing analysis based on timing graph 600. The timing analysis may be a portion of timing analysis phase 416. For example, processor 102 determines a fanin setup slack of an input of node B by applying:

fanin setup slack of an input of node $B$=clock period of a clock signal supplied to node $B$+clock-path delay to node $B$−clock-path delay to node $A$−data delay from node $A$ to node $B$ (1)

In this example, the clock period is a period of a clock signal supplied by node 602 and may be provided by the user via input device 112 (FIG. 1) to processor 102, may be hard-coded in processor 102, or determined by the processor 102 based on an estimate of achievable timing performance of node 602. Further, in this example, the clock-path delay to node B, clock-path delay to node A, and data delay from node A to node B are determined by processor 102 during delay annotator phase 414 and timing analysis phase 416. In this example, the clock-path delay to node B, clock-path delay to node A, and data delay from node A to node B are provided in timing graph 600.

As another example, processor 102 determines a fanout setup slack of an output of node B by applying:

fanout setup slack of an output of node $B$=clock period of a clock signal supplied to node $C$+clock-path delay to node $C$−clock-path delay to node $B$−data delay from node $B$ to node $C$ (2)

In this example, the clock-path delay to node C and data delay from node B to node C are determined by processor 102 during delay annotator phase 414 and timing analysis phase 416. Further, in this example, the clock-path delay to node C and data delay from node B to node C are provided in timing graph 600. As yet another example, processor 102 determines a fanin hold slack of an input of node B by applying:

fanin hold slack of an input of node $B$=data delay from node $A$ to node $B$−clock-path delay to node $B$+clock-path delay to node $A$ (3)

As still another example, processor 102 determines a fanout hold slack of an output of node B by applying:

fanout hold slack of an output of node $B$=data delay from node $B$ to node $C$−clock-path delay to node $C$+clock-path delay to node $B$ (4)

Processor 102 further determines a set of fanin setup slacks for all inputs of node B, a set of fanout setup slacks for all outputs of node B, a set of fanin hold slacks for all inputs of node B, and a set of fanout hold slacks for all outputs of node B in a similar manner described above with respect to a single input and a single output of the node B. Processor 102 determines 508 a minimum fanin setup slack of node B as a minimum of the fanin setup slacks of all the inputs of node B, a minimum fanout setup slack of node B as a minimum of the fanout setup slacks of all the outputs of node B, a minimum fanin hold slack of node B as a minimum of the fanin hold slacks of all the inputs of node B, and a minimum fanout hold slack of node B as a minimum of the fanout hold slacks of all the outputs of node B.

Processor 102 determines 510 a set of ideal clock-path delay changes, such as increases or decreases, to apply to node B based on the minimum fanin setup slack of the node B, the minimum fanin hold slack of the node B, the minimum fanout setup slack of the node B, and the minimum fanout hold slack of the node B. For example, processor 102 determines a minimum clock-path delay change to apply to node B and a maximum clock-path delay change to apply to the node B. In this example, processor 102 calculates an ideal setup delay adjustment for node B as a ratio of a first term and a second term. The first term is a maximum between zero and a difference between the minimum fanout setup slack of node B and the minimum fanin setup slack of node B. The second term is an integer, such as two. In this example, the ideal setup delay adjustment for node B is expressed as:

$$\text{ideal setup delay adjustment for node } B = [\max(0, \text{the minimum fanout setup slack of node } B - \text{the minimum fanin setup slack of node } B)]/2 \quad (5)$$

Moreover, in this example, processor 102 calculates an ideal hold delay adjustment for node B as a ratio of a third term and a fourth term. The third term is a maximum between zero and a difference between the minimum fanin hold slack of node B and the minimum fanout hold slack of node B. The fourth term is an integer, such as two. In this example, the ideal hold delay adjustment for node B is expressed as:

$$\text{ideal hold delay adjustment for node } B = [\max(0, \text{the minimum fanin hold slack of node } B - \text{the minimum fanout hold slack of node } B)]/2 \quad (6)$$

In this example, the ideal setup delay adjustment helps achieve a balanced setup margin for node B by comparing inputs of the node B and outputs of the node B. In this example, the ideal hold delay adjustment for node B helps achieve a balanced hold margin for node B by comparing inputs of the node B and outputs of the node B.

Further, in this example, processor 102 computes a delay adjustment limit to avoid setup problem at node B as a maximum between the minimum fanout setup slack of node B and the ideal setup delay adjustment for node B. The delay adjustment limit to avoid setup problem at node B is expressed as:

$$\text{delay adjustment limit to avoid setup problem at node } B = \max(\text{the minimum fanout setup slack of node } B, \text{the ideal setup delay adjustment for node } B) \quad (7)$$

In this example, processor 102 computes a delay adjustment limit to avoid hold problem at node B as a maximum between the minimum fanin hold slack of node B and the ideal hold delay adjustment for node B. The delay adjustment limit to avoid hold problem at node B is expressed as:

$$\text{delay adjustment limit to avoid hold problem at node } B = \max(\text{the minimum fanin hold slack of node } B, \text{the ideal hold delay adjustment for node } B) \quad (8)$$

The delay adjustment limits are maximum clock delays that can be added to node B before setup or hold problems are introduced. In this example, processor 102 determines a maximum clock delay change to apply to node B as a minimum of the delay adjustment limit to avoid setup problem at node B and the delay adjustment limit to avoid hold problem at node B. Further, in this example, processor 102 determines a delay adjustment limit to fix setup problem at node B as a minimum of a fifth term and a sixth term. The fifth term includes a maximum of zero and a negative of the minimum fanin setup slack of node B. The sixth term is the ideal setup delay adjustment for node B. The delay adjustment limit to fix setup problem at node B is expressed as:

$$\text{delay adjustment limit to fix setup problem at node } B = \min(\max(0, -\text{the minimum fanin setup slack of node } B), \text{the ideal setup delay adjustment at node } B) \quad (9)$$

Moreover, in this example, processor 102 determines a delay adjustment limit to fix hold problem at node B as a minimum of a seventh term and an eighth term. The seventh term includes a maximum of zero and a negative of the minimum fanout hold slack of node B. The eighth term is the ideal hold delay adjustment at node B. The delay adjustment limit to fix hold problem at node B is expressed as:

$$\text{delay adjustment limit to fix hold problem at node } B = \min(\max(0, -\text{the minimum fanout hold slack of node } B), \text{the ideal hold delay adjustment at node } B) \quad (10)$$

In this example, processor 102 determines a minimum clock delay change to apply to node B as a maximum of the delay adjustment limit to fix setup problem at node B and the delay adjustment limit to fix hold problem at node B. In this example, the delay adjustment limits to fix problems are delays that should be added in order to repair setup and hold problems at node B. In this example, the minimum clock delay change and the maximum clock delay change are the set of ideal clock-path delay changes that are proposed for node B.

As another example, processor 102 determines a single path delay change to apply to node B as a maximum of a ninth term and a tenth term. The ninth term includes a minimum of the ideal setup delay adjustment at node B and the delay adjustment limit to avoid hold problem at node B. The tenth term includes a minimum of the ideal hold delay adjustment at node B and the delay adjustment limit to avoid setup problem at node B. The single path delay change is expressed as:

$$\max(\min(\text{the ideal setup delay adjustment at node } B, \text{the delay adjustment limit to avoid hold problem at node } B), \min(\text{the ideal hold delay adjustment at node } B, \text{the delay adjustment limit to avoid setup problem at node } B)) \quad (11)$$

In equation (11), the full ideal setup delay adjustment is allowed if it does not introduce a hold violation at node B and the full ideal hold delay adjustment is allowed if it does not introduce a setup violation at node B. The single path delay change is generally larger than a minimum clock delay change used to meet timing because the single path delay tries to aim for a balanced margin on both an input side, including the inputs, of node B and an output side, including all the outputs, of node B. The single path delay change is another example of the set of ideal clock-path delay changes that are proposed for node B.

Processor 102 receives an initial set of clock-path delay requirements. The initial set of clock-path delay requirements may be received from the user via input device 112, or may be determined from an initial set of delays, which are or close to minimum achievable clock-path delays, from an earlier point in the flow of technique 400. Processor 102 determines a minimum achievable clock-path delay for a clock path by summing a set of annotated clock connection delays of a plurality of clock-path connections of the clock path. Processor 102 updates 512 the initial set of clock-path delay requirements of node B based on the set of ideal clock-path delay changes to generate a set of updated clock-path delay requirements. For example, if the initial clock-path delay requirement of a clock signal supplied by node 602 to node B is 2 nanoseconds (ns), processor 102 adds the minimum clock-path delay change, such as 0.2 ns, to the initial clock-path delay requirement to generate a minimum clock-path delay requirement and adds the maximum clock-path delay change, such as 0.5 ns, to the initial clock-path delay requirement to generate a maximum clock-path delay requirement. The minimum and maximum clock-path delay requirements are examples of the set of updated clock-path delay requirements. As another example, if the initial clock-path delay requirements of a clock signal supplied by node 602 to node B is 1.5 ns, processor 102 adds the single path delay change, such as 0.1 ns, to the clock-path delay to generate a single clock-path delay requirement. The single clock-path delay requirement is another example of the set of updated clock-path delay requirements. An advantage of computing both the minimum and maximum clock delay requirements is that the range of requirements between the minimum and maximum clock delay requirements gives slack allocation, described below, more flexibility to find suitable clock-path connection delays that suit all registers of PLD 200.

Processor 102 further performs 514 slack allocation to satisfy the set of updated clock-path delay requirements. For example, processor 102 performs slack allocation to increase delays to satisfy the minimum clock-path delay requirement while avoiding a violation of the maximum clock-path delay requirement. Processor 102 performs slack allocation on the set of updated clock-path delay requirements to generate a set of ideal clock-path connection delays. Each clock-path connection may receive a minimum ideal clock-path connection delay and a maximum clock-path connection delay. These ideal clock-path connection delays may be passed to an optimization tool, such as a synthesis, placement, or routing tool, executed by processor 102 to attempt to achieve these ideal delays. Note that connection delay requirements are computed because most optimization tools use connection-centric algorithms; optimization tools which understand path requirements can operate directly on the aforementioned path delay requirements. For example, during performance 514 of slack allocation, processor 102 receives the set of updated clock-path delay requirements as an input, timing graph 600 as another input, and a set of clock-path connection delay requirements as yet another input, and performs slack allocation based on the inputs to output the set of ideal clock-path connection delays, which are delays applied to connections of clock-paths of PLD 200. A plurality of clock-path connection delays on a path (the outputs) are such that the individual delays satisfy a set of clock-path connection delay requirements and the sums of these delays meet a set of clock-path delay requirements. In this example, the user may provide the set of clock-path connection delay requirements via input device 112 to processor 102, or the set of clock-path connection delay requirements may be hard-coded in processor 102 or may be determined by the processor 102 in an earlier point of the design flow of technique 400. Examples of the clock-path connection delay requirements include a minimum clock-path connection delay requirement of clock-path connection 612 and a maximum clock-path connection delay requirement of the clock-path connection 612. Other examples of the clock-path connection delay requirements include a single clock-path connection delay requirement (where the required minimum and maximum delays are equal) of clock-path connection 616. As yet another example, the clock-path connection delay requirements include a set of delay values to which clock path connections of PLD 200 are restricted.

As an example, the clock-path connection delay requirements may be based on a set of process and operating condition variations affecting PLD 200. In this example, the clock-path connection delay requirements may include amounts of delays that can be added to clock paths of PLD 200. To explain this example, the clock-path connection delay requirements include a set of upper delay limits to restrict how much delay can be added to each clock-path connection of PLD 200. The clock-path connection delay requirements can be used in conjunction with a plurality of beneficial skew requirements, such as the set of ideal clock-path delay changes, computed by the technique 500 described above to optimize a design of PLD 200. This amalgamation allows clock-path delays of PLD 200 to increase to benefit the timing of the design as long as each connection is not lengthened by more than a certain amount. The argument behind this is that as long as each connection remains lower than this certain amount, the delay uncertainty due to process and operating condition variations will be bounded. This limits how much process and operating condition variations can impact operational margin of PLD 200.

Alternatively, techniques described in U.S. Pat. No. 7,290,232, U.S. Pat. No. 7,254,789, and/or a patent application titled "Optimizing Long-path and Short-path Timing and Accounting for Manufacturing and Operating Condition Variability", having Ser. No. 11/857,316, filed on Sep. 18, 2007 can be used to account for all the process and operating condition variations when computing data-path slacks for technique 500 to use. The U.S. Pat. No. 7,290,232, U.S. Pat. No. 7,254,789, and the patent application titled "Optimizing Long-path and Short-path Timing and Accounting for Manufacturing and Operating Condition Variability", having Ser. No. 11/857,316, filed on Sep. 18, 2007 are incorporated by reference herein in their entirety.

As yet another example, techniques such as those in a patent application titled "Method and Apparatus For Performing Path-level Skew Optimization and Analysis for a Logic Design", having Ser. No. 11/267,655, filed on Nov. 4, 2005 can be used to compute connection-level slacks on the various clock-path connections of PLD 200 to restrict technique 500 to only increasing the delay of the longest clock path of PLD 200 by a limited amount. To explain, the clock-path connection delay requirements may include a required clock arrival time, which is the longest arrival time, of the clock signal supplied by node 602, at the start of technique 500, plus a constant, which may be provided by the user to processor 102 via input device 112, may be hard-coded in processor 102, or determined by the processor 102 at a previous point in the design flow of technique 400. This will allow clock-path delays to increase to benefit the timing of the design of PLD 200 as long as the longest clock path of PLD 200 in each clock domain is not lengthened by a certain amount. The argument behind this is as long as the longest clock-path delay remains lower than a certain amount, the uncertainty due to variation will be bounded. An alternative to limiting the path delays based on the longest clock path is to restrict the individual clock-path delays independently.

Figure 8:
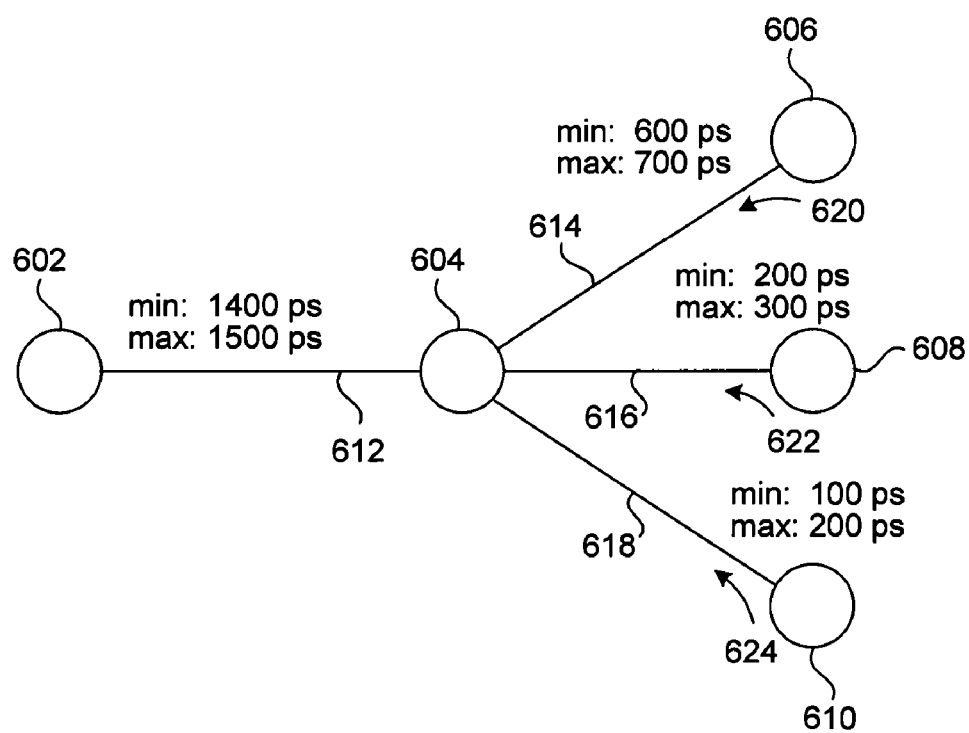
FIG. 8 shows an embodiment of the timing graph of FIG. 6.

Processor 102 performs 514 slack allocation to output the set of ideal clock-path connection delays. The clock-path connection delays are termed "ideal" because they are desirable for beneficial skew, but may not be realized during design implementation. For example, as illustrated in FIG. 8, if the minimum clock-path delay requirement for clock path 620 is 2 ns and the maximum clock-path delay requirement for the clock path 620 is 2.2 ns, processor 102 determines a minimum clock-path connection delay of clock-path connection 612 to be 1400 picoseconds (ps) and a minimum clock-path connection delay of clock-path connection 614 to be 600 ps, and determines a maximum clock-path connection delay of clock-path connection 612 to be 1500 ps and a maximum clock-path connection delay of clock-path connection 614 to be 700 ps. The minimum and maximum clock-path connection delays of clock-path connection 612 are examples of the set of ideal clock-path connection delays. The minimum and maximum clock-path connection delays of clock-path connection 614 are examples of the set of ideal clock-path connection delays.

As another example, if the single clock-path delay requirement for the clock path 622 is 1.7 ns (note the minimum and maximum requirements are both 1.7 ns), processor 102 determines a single clock-path connection delay of clock-path connection 612 to be 1400 ps and a single clock-path connection delay of clock-path connection 616 to be 300 ps. The single clock-path connection delay of clock-path connection 616 is an example of the set of ideal clock-path connection delays. Moreover, the single clock-path connection delay of clock-path connection 612 is another example of the set of ideal clock-path connection delays. Processor 102 may determine the set of ideal clock-path connection delays from the set of updated clock-path delay requirements based on techniques described in U.S. Pat. No. 7,207,020, titled "Method and Apparatus for utilizing Long-path and Short-path Timing Constraints in an Electronic-Design-Automation Tool" which is incorporated by reference herein in its entirety.

In some embodiments, the clock-path connection delay requirements are not provided by the user to processor 102 to perform slack allocation and processor 102 performs slack allocation without the requirements. In various embodiments, processor 102 performs long-path slack allocation to satisfy minimum clock-path delay requirements, by allocating long-path slack determined from maximum clock-path delay requirements. To help ensure the minimum clock-path delay requirements are satisfied, processor 102 applies higher slack-allocation weights to edges on paths failing their minimum clock-path delay requirements, where the weights may be a function of the magnitude of the failure. Note slack-allocation weights are used to guide where and how much slack is allocated according to U.S. Pat. No. 7,207,020. This approach can be beneficial because it avoids violation of maximum clock-path delay requirements, while repairing minimum clock-path delay violations.

Processor 102 updates 516 the set of annotated clock connection delays on timing graph 600 based on the set of ideal clock-path connection delays. For example, if one of the annotated delays of clock-path connection 616 is 1.2 ns, processor 102 updates the annotated delay to match the single clock-path connection delay of 1.3 ns. As another example, if one of the annotated delays of clock-path connection 616 is 1.2 ns, processor 102 updates the 1.2 ns to match 1.3 ns, which is the minimum clock-path connection delay of clock-path connection 616.

Processor 102 determines 518 whether to terminate execution of the technique 500 or to repeat another iteration of the technique 500, and upon determining to terminate, processor 102 ends the iteration of the technique 500 and outputs the last set of ideal clock-path connection delays, and on the other hand, upon determining not to terminate, processor 102 repeats another iteration, of technique 500, starting from technique 504 and ending at technique 518. For example, processor 102 receives a number of iterations of the technique 500 from the user via input device 112, determines whether the number of iterations have completed, continues to reiterate the technique 500 until the number is achieved, and terminates execution of the technique 500 upon performing that number of iterations. In this example, instead of receiving the number of iterations from the user, the number of iterations may be hard-coded in processor 102, or determined by the processor 102 based on its exit criteria.

By bounding the number of iterations performed, technique 500 is linear with design size. As another example, processor 102 determines whether the set of ideal clock-path delays are no longer changing much from iteration to iteration of technique 500 and upon determining so, processor 102 ends the technique 500. The set of ideal clock-path delays do not change much from iteration to iteration if the set of ideal clock-path delay changes are less than an absolute or fractional tolerance from one iteration to another. Otherwise, in this example, processor 102 continues to reiterate the technique 500. Further, in this example, the absolute or fractional tolerance may be provided by the user via input device 112, may be hard-coded in processor 102, or determined by the processor 102 based on its exit criteria. As yet another example, processor 102 may determine whether the set of ideal clock-path delays converge to any of a set of values and upon determining so, processor 102 ends the technique 500. Otherwise, in this example, processor 102 continues to reiterate the technique 500 until the convergence is achieved. Further, in this example, the set of values, which may be values having a certain number of decimal places, may be provided by the user via input device 112, may be hard-coded in processor 102, or determined by the processor 102 based on its exit criteria. Note that because this technique 500 is iterative and many slack allocation techniques are iterative, each iteration of this technique 500 may only perform a fraction of the number of slack-allocation iterations typically needed to get a good solution. That is, since this technique 500 will converge over time, perfect convergence of each slack allocation invocation is generally unnecessary.

The technique 500 illustrated in FIG. 5 starts with the set of annotated clock connection delays. During execution of the technique 500, a set of data path delays, such as the data delay from node A to node B and data delay from node B to node C, of timing graph 600 are not updated and are realistic so that the clock paths of timing graph 600 are optimized. Each iteration of the technique 500 changes, such as increases or decreases, clock-path delays of PLD 200 to try to achieve the clock-path delay requirements computed for that iteration. Note that because all delays only increase (or only decrease) in a given iteration of technique 500, it is safe for technique 500 to figure out clock-path delay adjustments for each register of PLD 200 in isolation of other changes to PLD 200. That is, even though independent decisions are made for multiple registers of PLD 200, and the decision for each register of PLD 200 assumes no other changes are made to the design of PLD 200, no unexpected timing failures will be caused when all the changes are made. For example, if processor 102 determines that it is safe to increase the clock-path delay requirement of register A by x ps based on input hold slack and output setup slack of the register A during an iteration of the technique 500, assuming no other changes, even if other registers of system 700 decide to add delay, the addition of delay to the other registers only improves input hold timing and/or output setup timing of register A.

Figure 9:
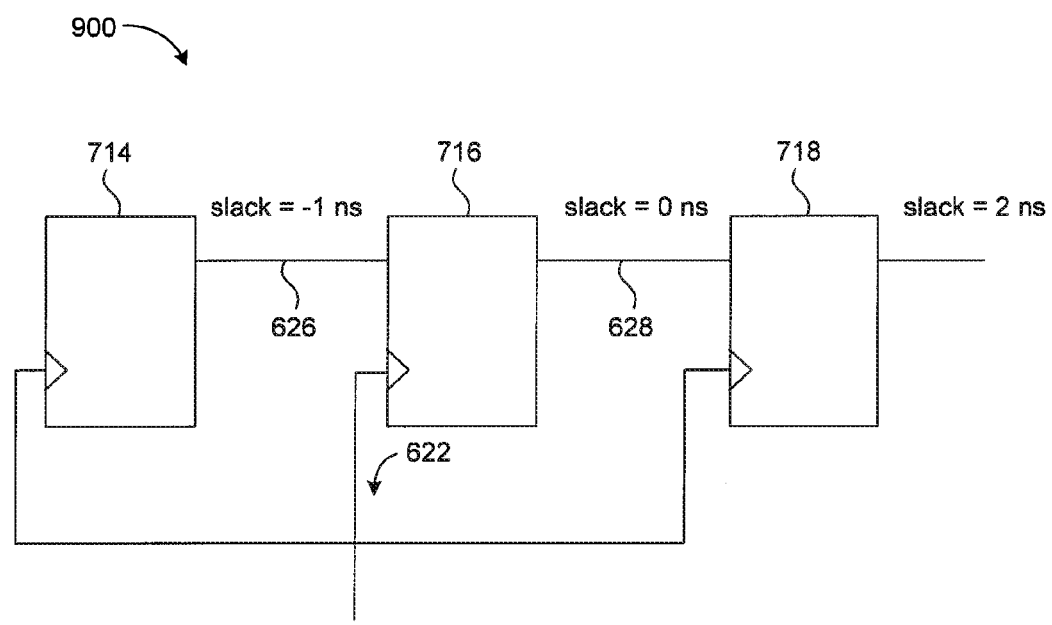
FIG. 9 shows another embodiment of the timing graph of FIG. 6.

In various embodiments, several iterations of the technique 500 are executed by processor 102. Technique 500 is iterative to allow globally good skewing solutions to be found. For example, sometimes several iterations of technique 500 are needed to be executed by processor 102 for a register of a timing graph 900, shown in FIG. 9, to get enough setup margin on an output to be able to add delay to a clock signal received by the register to improve input setup timing. To add a clock-path delay to the clock path 622 reaching register B to improve a setup slack of data connection 626 (A→B), processor 102 must improve a setup slack of data connection 628 (B→C). Consequently, processor 102 may execute several iterations of the technique 500 to improve the setup slack of data connection 626 (A→B) to a point that the data connection 626 (A→B) is passing setup timing. For similar reasons, it can be beneficial to target for more than zero slack when computing the set of clock-path delay changes, so that margin can be achieved to enable optimization of other paths of timing graph 900.

In various embodiments, system 700 is an integrated circuit. In other various embodiments, during performance 514 of slack allocation, processor 102 accounts for the set of clock-path connection delay requirements that include a minimum clock-path connection delay requirement and a maximum clock-path connection delay requirement, a single clock-path connection delay requirement, or a quantized clock-path connection delay requirement. If some clock-path connections of system 700 (FIG. 7) can achieve clock-path connection delays within a small range, such as between the minimum clock-path connection delay requirement of 250 ps and the maximum clock-path connection delay requirement of 280 ps or between the minimum clock-path connection delay requirement of 300 ps and the maximum clock-path connection delay requirement of 320 ps, or some clock-path connections of system 700 (FIG. 7) have a single clock-path connection delay requirement (where the minimum and maximum delays are equal), or some clock-path connections of the system have the quantized clock-path connection delay requirement, processor 102 satisfies the requirements during slack allocation. For example, without applying the set of clock-path connection delay requirements, if the minimum clock-path delay requirement for clock path 622 is 1.6 ns and the maximum clock-path delay requirement for the clock path 622 is 1.8 ns, processor 102 determines a minimum clock-path connection delay of clock-path connection 612 to be 1400 ps and a minimum clock-path connection delay of clock-path connection 616 to be 200 ps, and determines a maximum clock-path connection delay of clock-path connection 612 to be 1500 ps and a maximum clock-path connection delay of clock-path connection 616 to be 300 ps. In this example, upon determining that the minimum clock-path connection delay requirement of clock-path connection 616 is 250 ps and the maximum clock-path connection delay requirement of clock-path connection 616 is 280 ps, processor 102 determines a minimum clock-path connection delay of clock-path connection 612 to be 1350 ps and a minimum clock-path connection delay of clock-path connection 616 to be 250 ps, and determines a maximum clock-path connection delay of clock-path connection 612 to be 1520 ps and a maximum clock-path connection delay of clock-path connection 616 to be 280 ps.

As another example, without applying the set of clock-path connection delay requirements, if the minimum clock-path delay requirement for clock path 622 is 1.6 ns and the maximum clock-path delay requirement for the clock path 622 is 1.8 ns, processor 102 determines a minimum clock-path connection delay of clock-path connection 612 to be 1400 ps and a minimum clock-path connection delay of clock-path connection 616 to be 200 ps, and determines a maximum clock-path connection delay of clock-path connection 612 to be 1500 ps and a maximum clock-path connection delay of clock-path connection 616 to be 300 ps. In this example, upon determining that the single clock-path connection delay requirement (where the minimum and maximum delays are equal) of clock-path connection 616 is 250 ps, processor 102 determines a minimum clock-path connection delay of clock-path connection 612 to be 1350 ps, a maximum clock-path connection delay of clock-path connection 612 to be 1550 ps, and a single clock-path connection delay of clock-path connection 616 to be 250 ps.

As yet another example, processor 102 considers restrictions on the granularity of delays achievable on clock paths because of the resources available. Examples include restrictions where clock-path delays can only increase in 100 ps increments, or only a single increase of 100 ps may be available. The processor 102 may quantize the clock-path connection delays at the end of some slack-allocation iterations to the actual delays achievable. The feasible delay options can be stored as a list of discrete delays or as a rule such as delays can be an integer multiple of 100 ps, for example. When quantizing delays based on the granularity of achievable delays, delays can be adjusted to the nearest achievable one, or rounded down to the nearest achievable one if iterations are generally increasing delays. Note that with these restrictions, some iterations may want to reduce clock-path delays because ideal delays may be overshot with quantization of delays. It should also be noted that having iterations that reduce delay is useful to reduce the likelihood of accepting solutions with unnecessary clock delay.

In other various embodiments, during performance 514 of slack allocation, processor 102 accounts for the set of clock-path connection delay requirements during later iterations of the technique 500 and not during earlier iterations of the technique 500. This may be favorable because the algorithm may take more than one iteration to change a connection delay sufficiently to move from one achievable delay to the next. The earlier iterations and the later iterations may be specified by the user via input device 112, may be hard-coded in processor 102, or may be determined by the processor 102 based on its exit criteria. For example, the earlier iterations include iterations 1 through 10 and the later iterations include iterations 11 through 20.

Figure 10:
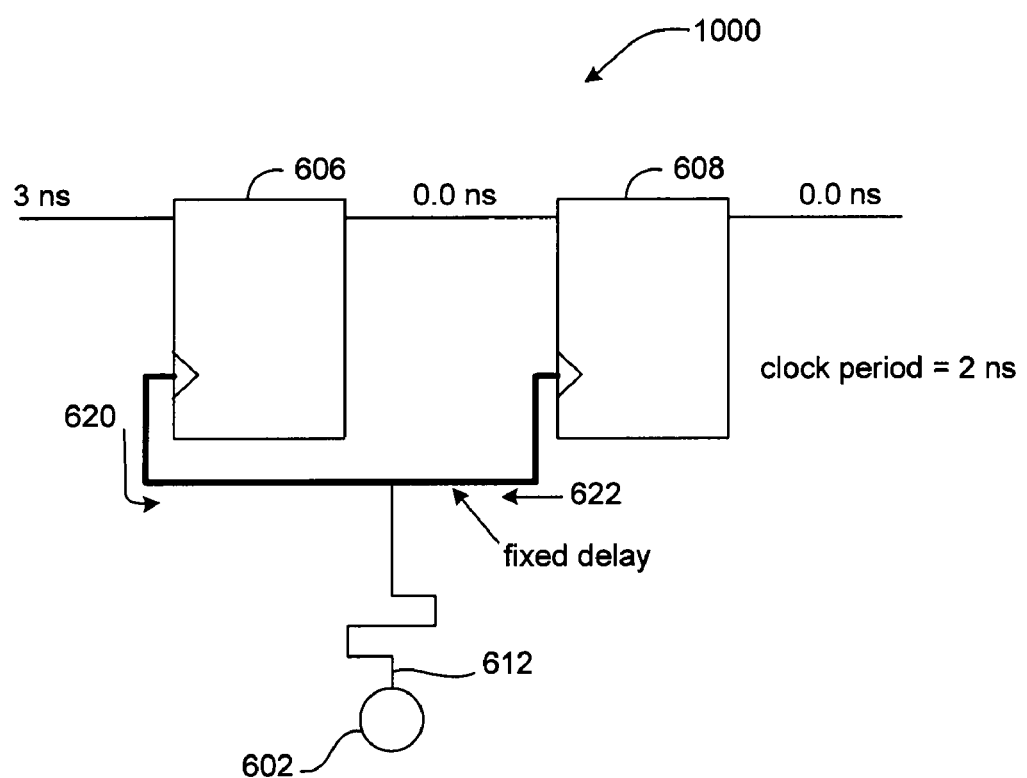
FIG. 10 shows an embodiment of a portion of the timing graph of FIG. 6.

In various embodiments, processor 102 identifies a group of related registers that have a conflict. For example, as illustrated in FIG. 10, which is an exemplary timing graph 1000, clock-path connection 612, exemplified as a variable delay connection, exists on clock path 620 and clock path 622. In this example, processor 102 determines that register A and register B receive the same relative clock skew because a clock-path delay cannot be added to clock path 620 without affecting clock path 622. In this example, the set of ideal clock-path delay changes calculated for register B by using the technique 500 of FIG. 5 indicates that zero clock-path delay is added to clock path 622 because any other clock-path delay change creates a hold violation between register A and register B. Consequently, in this example, processor 102 determines not to add a clock-path delay to clock path 620 and clock path 622 even though the delay could benefit the clock path 620.

In this example, processor 102 determines that a delay provided to register A via clock path 620 and a delay provided via clock path 622 to register B cannot change independent of each other, and so there is a first dependency cycle between the delays. In this example, processor 102 determines that the delay via clock path 622 provided to register B cannot change until the delay provided via clock path 620 to register A changes, and the delay provided via clock path 620 to register A cannot change because the delay provided via clock path connection 612 cannot change because it would affect clock path 622 which would adversely affect register B.

Figure 11:
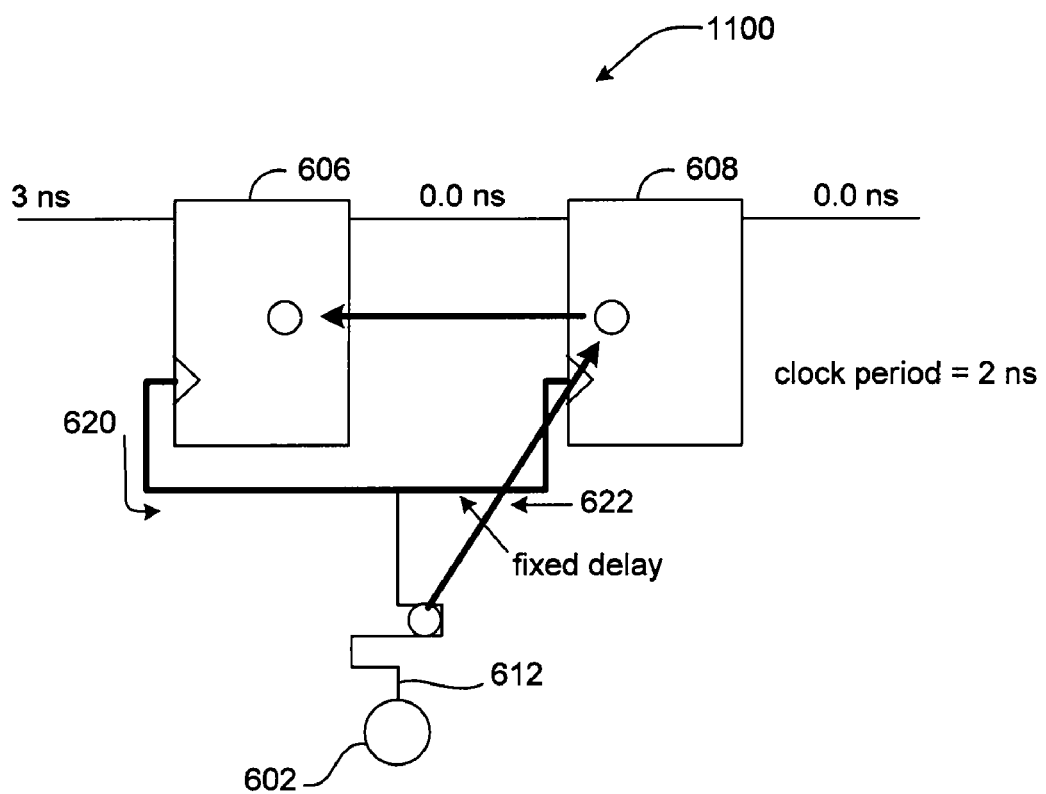
FIG. 11 shows an embodiment of the timing graph of FIG. 10.

Further, in this example further illustrated with respect to FIG. 11, which is an exemplary timing graph 1100, processor 102 determines a dependency graph where register B points to register A because the clock delay of register B cannot change unless the clock delay of register A changes to increase the fanin hold slack of register B. Further, in this example, processor 102 determines that register A points to clock connection 612 because the clock delay of register A cannot change unless a connection delay 612 of clock path 620 is changed. Finally, processor 102 determines that the connection delay 612 cannot tolerate a delay change because the delay of clock path 622 to register B cannot change.

Figure 12:
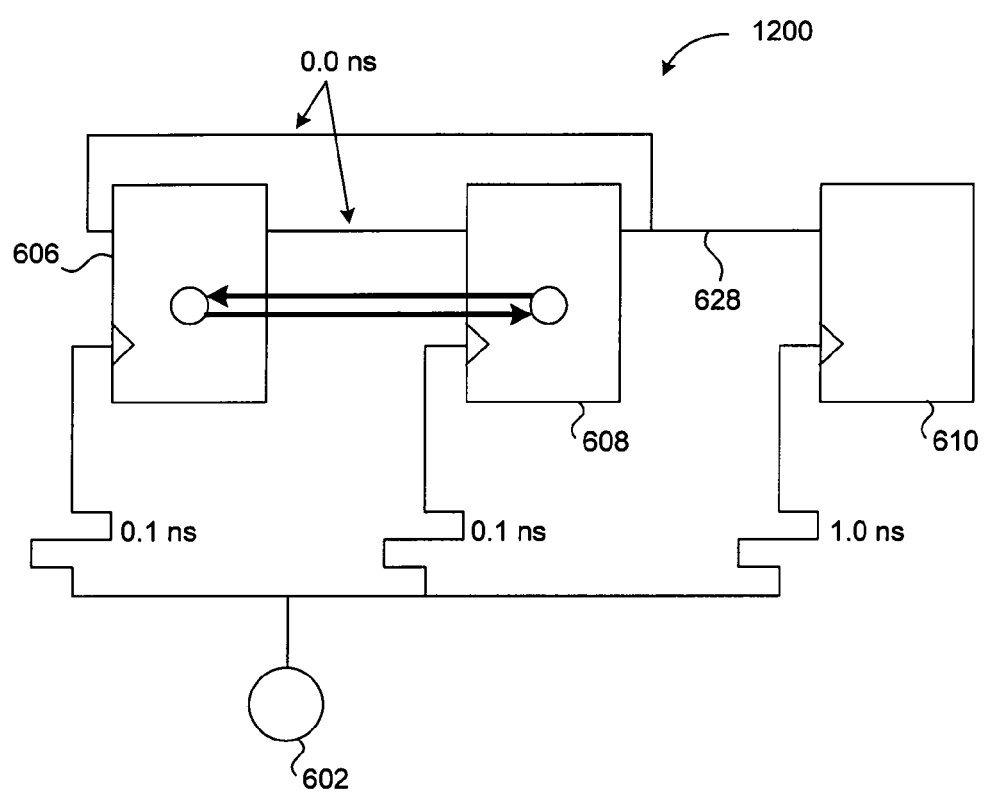
FIG. 12 is another timing graph used to illustrate another technique for determining beneficial delays for clock-path connections.

As another example, illustrated with respect to FIG. 12 is an exemplary timing graph 1200. Processor 102 determines a dependency graph where register B points to register A because the clock delay to register B cannot change unless a fanout hold slack of register A changes. Further, in this example, processor 102 determines that register A points to register B because a fanout hold slack of register A cannot change unless a fanout hold slack of register B changes and that the changes in the fanout hold slack of register B changes a fanin hold slack of register A. Processor 102 determines that this second dependency cycle between a fanout slack of register B, a fanout slack of register A, a fanin slack of register A, and a fanin slack of register B results in the conflict so that a timing of data connection 628 cannot be improved.

Processor 102 addresses the first and second dependency cycles and reduces, chances of the conflict, such as avoids the conflict, by forming a group of registers, such as register A and register B, having the dependency cycles, by determining to include the registers in the group, determining slacks for the group, and determining the set of ideal clock-path delay changes for the group.

To identify the group, processor 102 performs a backward recursive traversal from a clock input of each register of PLD 200 until a variable delay connection is found. For example, with reference to FIG. 10, processor 102 performs the backward recursive traversal from each of register A and register B to find clock-path connection 612, which is a variable delay connection. All registers, such as register A and register B, downstream of the variable delay connection, are considered part of the group by processor 102 because a change to the variable delay connection affects register A and register B equally.

Figure 13:
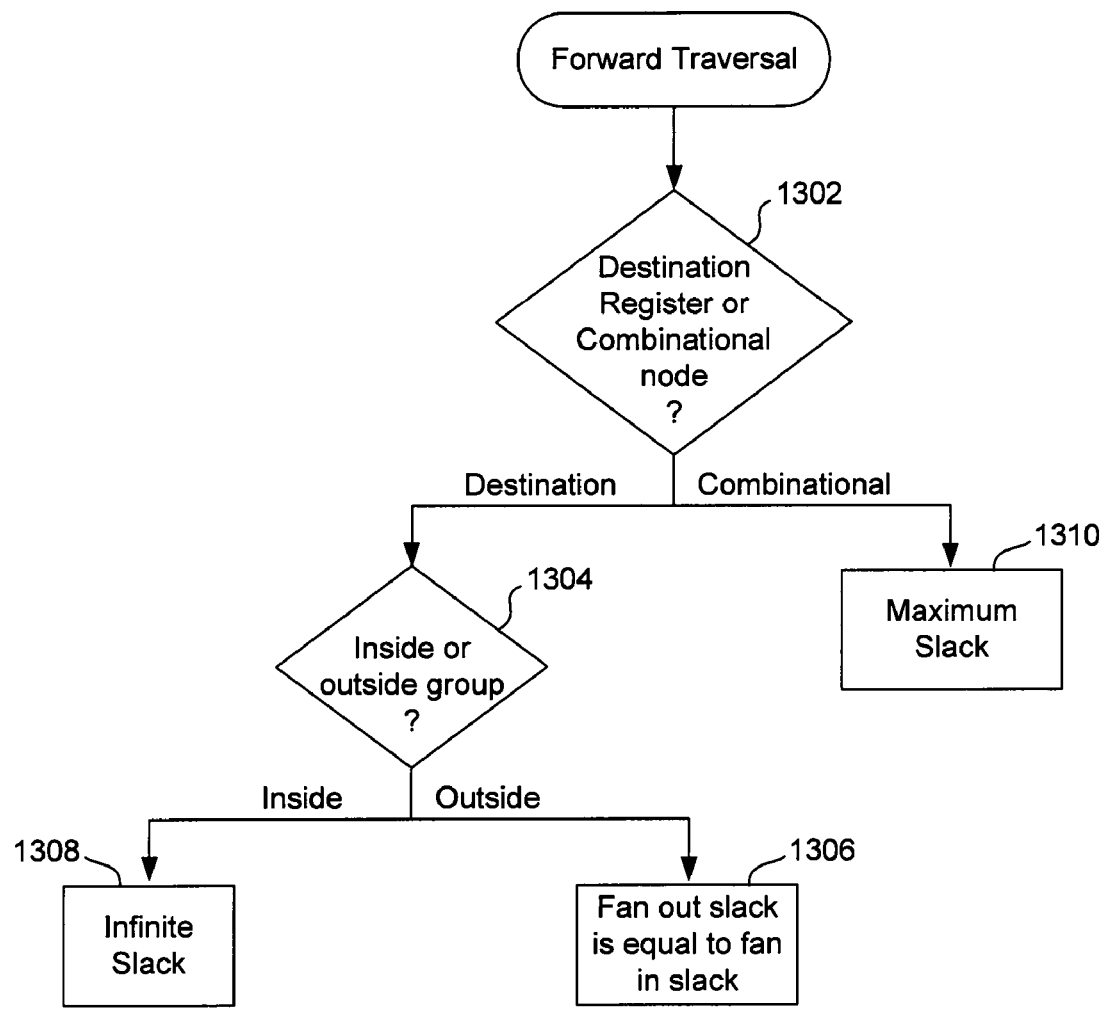
FIG. 13 is a flowchart of an embodiment of a forward recursive traversal technique used for a group of nodes of the system of FIG. 1.

After starting to perform technique 504 and before performing technique 510 for each register of PLD 200, processor 102 processes each register in the group, one at a time, to determine a fanout slack of the group and a fanin slack of the group. To compute the fanout slack of the group, processor 102 determines fanout slacks of all source registers of the group. To compute a fanout slack, such as a fanout hold slack or a fanout setup slack, of register A, processor 102 performs a forward recursive traversal from a data output of the register A. An embodiment of the forward recursive traversal is shown in a flowchart of FIG. 13. Processor 102 determines 1302 whether the forward recursive traversal reaches register B, which is a destination register, or reaches a first combinational node. Upon determining that the forward recursive traversal reaches register B, which is a destination register, processor 102 determines 1304 whether the destination register is within or outside the group. Further, upon determining that register B, which is a destination register, is outside the group, processor 102 returns 1306 the fanin slack of the destination register. For example, when the forward recursive traversal reaches register B, which is a destination register, if register B is outside of the group, processor 102 returns the fanin setup slack of the register B. As another example, when the forward recursive traversal reaches register B, which is a destination register, if register B is outside of the group, processor 102 returns the fanin hold slack of the register B. Upon determining that register B, which is a destination register, is inside the group, processor 102 returns 1308 infinite slack (because slacks within the group do not matter).

Upon determining that the forward recursive traversal from register A reaches the first combinational node instead of node B, which is a destination register, processor 102 returns a maximum of a fanin slack of the first combinational node and a minimum of the slacks of all outputs of the first combinational node returned by the forward recursive traversal. Note that a maximum of these two values is an approximation of the value we are interested in (the slack ignoring all intra-group paths); a maximum is taken of the two values because each may under-estimate the slack (the first may be lower because of intra-group paths and the second may be lower because of other fanin paths). For example, if the forward recursive traversal from register A reaches the first combinational node instead of node B, which is a destination register, processor 102 returns a maximum of a fanin setup slack of the first combinational node and a minimum of the setup slacks of all outputs of the first combinational node returned by the forward recursive traversal. As another example, if the forward recursive traversal from register A reaches the first combinational node instead of node B, which is a destination register, processor 102 returns a maximum of a fanin hold slack of the first combinational node and a minimum of the hold slacks of all outputs of the first combinational node returned by the forward recursive traversal.

Processor 102 performs the forward recursive traversal for all registers of the group to determine fanout slacks of the source registers. Processor 102 determines the fanout slack of the group equal to a minimum of the fanout slacks computed for the registers in the group from the forward recursive traversals. Note that traversal data can be cached on the respective nodes to avoid re-traversals when processing the various registers in the group. For example, processor 102 determines a fanout setup slack of the group equal to a minimum of the fanout setup slacks computed for the source registers in the group from the forward traversals. As another example, processor 102 determines a fanout hold slack of the group equal to a minimum of the fanout hold slacks computed for the source registers in the group from the forward traversals.

Figure 14:
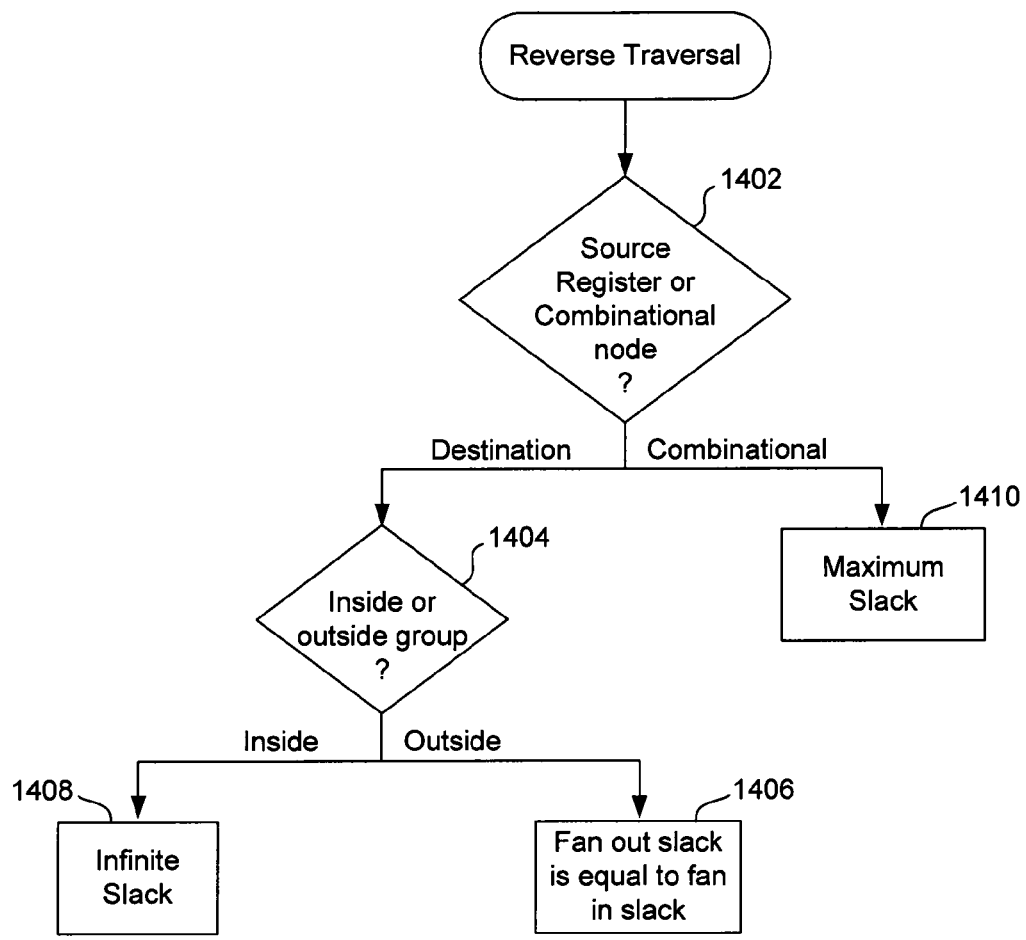
FIG. 14 is a flowchart of an embodiment of a backward recursive traversal technique used for a group of nodes of the system of FIG. 1.

To compute the fanin slack of the group, processor 102 determines fanin slacks of all registers of the group. To compute a fanin slack, such as a fanin hold slack or a fanin setup slack, for register B, processor 102 performs a backward recursive traversal from a data input of the register B. An embodiment of the backward recursive traversal is shown in a flowchart of FIG. 14. Processor 102 determines 1402 whether the backward recursive traversal reaches register A, which is a source register, or reaches a second combinational node. Upon determining that the backward recursive traversal reaches register A, which is a source register, processor 102 determines 1404 whether the source register is within or outside the group. Further, upon determining that register A, which is a source register, is outside of the group, processor 102 returns 1406 a fanout slack of the source register. For example, when the backward recursive traversal reaches register A, which is a source register, if register A is outside of the group, processor 102 returns a fanout setup slack of the register A. As another example, when the backward recursive traversal reaches register A, which is a source register, if register A is outside of the group, processor 102 returns a fanout hold slack of the register A. Upon determining that register A, which is a source register, is inside the group, processor 102 returns 1408 infinite slack.

Upon determining that the backward recursive traversal from register B reaches the second combinational node, processor 102 returns 1410 a maximum of a fanout slack of the second combinational node and a minimum of the slacks of all inputs of the second combinational node returned by the backward recursive traversal. For example, if the backward recursive traversal from register B reaches the second combinational node instead of node A, which is a source register, processor 102 returns a maximum of a fanout setup slack of the second combinational node and a minimum of the setup slacks of all inputs of the second combinational node returned by the backward recursive traversal. As another example, if the backward recursive traversal from register B reaches the second combinational node instead of node A, which is a source register, processor 102 returns a maximum of a fanout hold slack of the second combinational node and a minimum of the hold slacks of all inputs of the second combinational node returned by the backward recursive traversal.

Processor 102 performs the backward recursive traversal for all registers of the group to determine fanin slacks of the destination registers. Processor 102 determines the fanin slack of the group equal to a minimum of the fanin slacks computed for the destination registers in the group from the backward recursive traversals. For example, processor 102 determines a fanin setup slack of the group equal to a minimum of the fanin setup slacks computed for the registers in the group from the backward recursive traversals. As another example, processor 102 determines a fanin hold slack of the group equal to a minimum of the fanin hold slacks computed for the registers in the group from the backward recursive traversals.

In other embodiments, the fanin and fanout slacks for the group can be computed by processor 102 from a timing analysis where all the data paths within the respective group are cut, so that only inter-group data paths are analyzed. Data paths within a group are unaffected by delaying a clock signal received by the group because the delay affects all registers identically, so those paths should be ignored for this analysis.

Processor 102 determines a set of ideal clock-path delay changes for the group based on the fanin and fanout slacks of the group in a manner similar to that described above for determining the set of ideal clock-path delay changes for node B based on the fanin and fanout slacks of the node B. For example, processor 102 determines an ideal setup delay adjustment for the group by applying equation (5) to the group instead of a node. To explain, processor 102 determines:

$$\text{ideal setup delay adjustment for the group} = [\max(0, \text{the minimum fanout setup slack of the group} - \text{the minimum fanin setup slack of the group})]/2 \quad (12)$$

Moreover, in this example, processor 102 calculates an ideal hold delay adjustment of the group by applying equation (6) to the group instead of a node. To explain, processor 102 determines the ideal hold delay adjustment of the group as:

$$\text{ideal hold delay adjustment for the group} = [\max(0, \text{the minimum fanin hold slack of the group} - \text{the minimum fanout hold slack of the group})]/2 \quad (13)$$

Similarly, in this example, processor 102 computes a delay adjustment limit to avoid setup problem at the group by applying equation (7) to the group instead of a node, computes a delay adjustment limit to avoid hold problem at the group by applying equation (8) to the group instead of a node, and determines a maximum clock delay increase to apply to the group as a minimum of the delay adjustment limit to avoid setup problem at the group and the delay adjustment limit to avoid hold problem at the group. Further, in this example, processor 102 determines a delay adjustment limit to fix setup problem at the group by applying equation (9) to the group instead of a node, determines a delay adjustment limit to fix hold problem at the group by applying equation (10) to the group instead of a node, and determines a minimum clock delay change to apply to the group as a maximum of the delay adjustment limit to fix setup problem at the group and the delay adjustment limit to fix hold problem at the group.

As another example, processor 102 determines a single path delay change to apply to the group by applying equation (11) to the group instead of a node. The minimum clock delay change to apply to the group and the maximum clock delay change to apply to the group are examples of a set of ideal clock-path delay changes that are applied to the group. The single path delay change to apply to the group is another example of the set of ideal clock-path delay changes that are applied to the group.

Processor 102 applies the set of ideal clock-path delay changes to be applied to the group to each node of the group, updates 512 a set of clock-path delay requirements of each node based on the set of ideal clock-path delay changes to generate a set of updated clock-path delay requirements for the nodes, and performs 514 slack allocation to satisfy the set of updated clock-path delay requirements to generate a set of ideal clock-path connection delays, and updates the set of annotated clock connection delays on timing graph 600 with the set of ideal clock-path connection delays.

Figure 15:
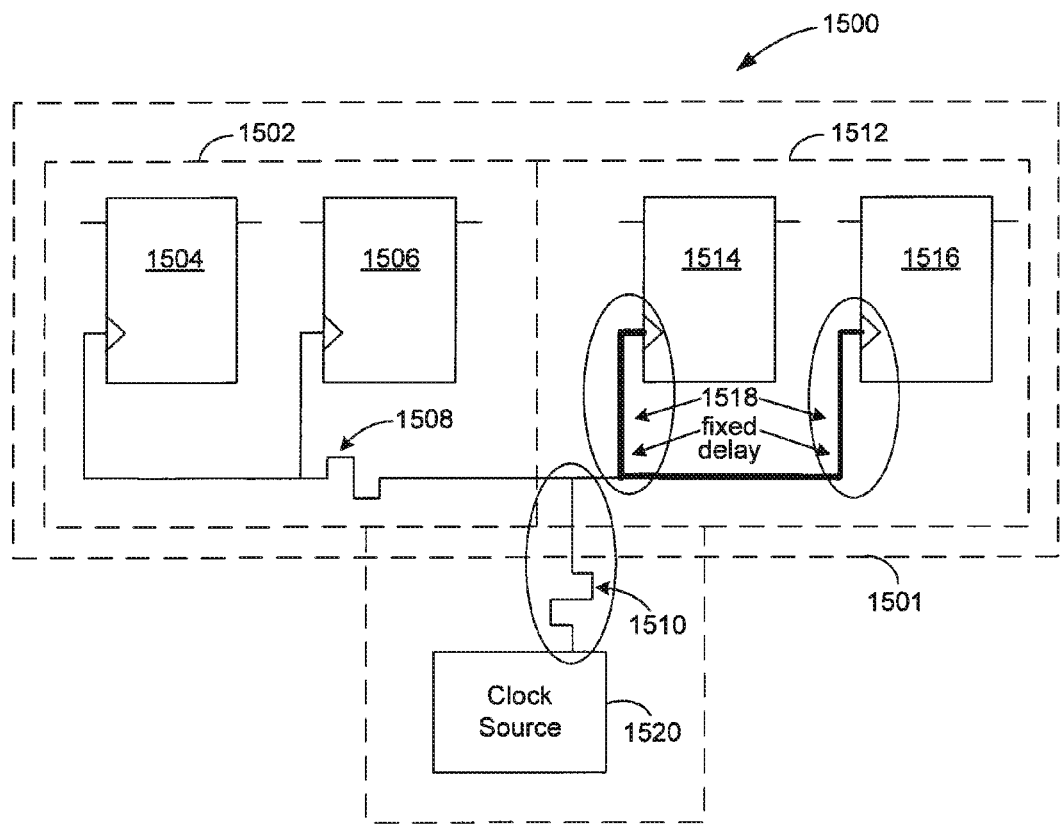
FIG. 15 is an exemplary timing graph used to illustrate a group of nodes of the system of FIG. 1.

In various embodiments, processor 102 may form subgroups within the groups to handle more complex clocking topologies. For example, FIG. 15 is an exemplary timing graph 1500. In this example, timing graph 1500 represents a portion of PLD 200 (FIG. 2). In this example, in some clocking topologies, groups, such as a group 1501 including a plurality of sub-groups 1502 and 1512, are found by processor 102 within PLD 200 because, for example, half of the group 1501 of a plurality of registers 1504, 1506, 1514, and 1516 downstream of a variable delay connection 1510 may be fed through a set 1518 of fixed (or single-delay) connections, and the other half of the group 1501 of registers may be fed through a variable-delay connection 1508. The half of the group 1501 fed through set 1518 includes sub-group 1512 and the other half of group 1501 fed through connection 1508 includes sub-group 1502. Further, in this example, only a single larger group, such as group 1501, may be identified by processor 102 and the intermediate variable-delay connection 1508 can be constrained to be fixed delay by processor 102.

The group 1501 is formed by processor 102 so that only clock paths that can be freely optimized will be considered by processor 102 when determining a set of ideal clock-path delays for the group 1501. The group 1501 is optimized considering the paths emerging from the group 1501 as a whole, ignoring all the intra-group data paths. Alternatively, the half, such as sub-group 1502, fed through intermediate variable-delay connection 1508 can consider all data paths outside of the sub-group 1502 because that sub-group 1502 can be optimized independently; while the other half, such as sub-group 1512, can consider only data paths outside the group 1501 because this half can only make adjustments that affect the group 1501 as a whole. Note that in most FPGA clocking topologies, this case rarely occurs though. That is, in practice, the last level of variable delay connections, such as a variable delay connection 1510, will generally only be followed by fixed delay connections until registers are reached. That said, in some cases, variable delay connections may have limited achievable delay options, and in those cases, they can start to look like fixed-delay connections, similar to connections 1518, and it can be beneficial to treat them, and other corresponding connections on the same level, accordingly. Variable delay connection 1510 is connected to a clock source 1520, which is an example of any of clock sources 702, 704, and 706 (FIG. 7).

In various embodiments, processor 102 may construct a dependency graph, based on a timing graph such as timing graph 1200 and dependencies identified in the timing graph to assist in finding dependency cycles. This may be done, if, after several iterations of technique 500, a clock delay is unchanged and a change would have been beneficial to improve some clock path of PLD 200. A clock delay to a register, or other storage element, may remain unchanged if such a change would cause a timing violation in the input or output paths of the register. Or if such a change would cause a change in the clock-path delays of other registers, causing a timing violation elsewhere. To detect conflicts, the dependency graph contains nodes which represent the respective storage elements and the respective clock-path connections. A directed edge is created from each node to the "problematic node" that limits improvement. The first and second dependency cycles may be found by looking for cycles in the dependency graph. To help address the conflict, such as avoid the conflict, a collection can be formed which includes the groups and registers involved in the conflict. Collection processing is analogous to group processing. For example, after performing technique 504 and before performing technique 510 for each register of PLD 200, processor 102 processes each register in the collection, one at a time, to determine a set of fanout slacks of the collection and a set of fanin slacks of the collection. As another example, processor 102 determines a set of ideal clock-path delay changes for the collection based on a plurality of fanin and fanout slacks of the collection in a similar manner as that of determining the set of ideal clock-path delay changes for node B based on a plurality of fanin and fanout slacks for node B. As yet another example, processor 102 determines an ideal setup delay adjustment for the collection by applying equation (5) to the collection instead of a node. As still another example, processor 102 applies the set of ideal clock-path delay changes determined for the collection to each node of the collection, updates 512 a set of clock-path delay requirements of the nodes based on the set of ideal clock-path delay changes to generate a set of updated clock-path delay requirements for the nodes, and performs 514 slack allocation to generate a set of ideal clock-path connection delays that satisfy the set of updated clock-path delay requirements, and updates the set of annotated clock connection delays on a timing graph, such as timing graph 600, with the set of ideal clock-path connection delays.

In various embodiments, all the relative clock-path delays in the collection, such as the collection formed in 1200, should be unchanged to preserve the timing of paths within the collection. When the techniques of U.S. Pat. No. 7,207,020 are applied by processor 102 to allocate slack, at the end of each slack allocation iteration, processor 102 may modify all the clock-path delays so a relationship between clock-path delays within the collection is preserved. For example, if more delay is added to one clock-path than another within the collection in 1200, the delays can be adjusted by processor 102 so that all clock paths of the collection receive the minimum delay adjustment. Alternatively, processor 102 alters a timing graph including a collection, such as the collection formed in 1200, so that there is a common clock-path connection that can be adjusted that feeds fixed-delay connections reaching all the members of the collection. By setting the appropriate fixed-delays, by construction, all the clock-path delays of the collection will be forced to change in step.

In other embodiments, processor 102 forms a group or collection independent of determining that a dependency cycle exists. The group or collection formed independent of determining that a dependency cycle exists can be based on the respective registers in a long chain of dependencies for the purpose of saving runtime. That is, it can take many cycles to move margin to where it is needed to fix a timing critical path because of a long chain of dependencies. Grouping can help move margin to where it is needed in less runtime by avoiding long chains of dependencies. Further, in various embodiments, to save runtime, during each iteration of the technique 500, processor 102 analyzes and processes only portions of a timing graph that have been affected by changes made in the preceding iteration and does not analyze and process any portions of the graph that have not been affected by changes made in the preceding iteration.

The techniques for determining beneficial clock-path connection delays are described with reference to PLD 200. It should be appreciated that the techniques for determining beneficial clock-path connection delays may be used in any electronic design automation (EDA) tool for the creation, processing, optimization, or implementation of any electronic design, such as that encountered in the creation of another integrated circuit, such as an application specific integrated circuit (ASIC), a custom ASIC, a standard cell ASIC, a structured ASIC, a gate-array ASIC, and a field programmable gate array (FPGA).

Although the techniques described herein are described with respect to registers, it is noted that in other embodiments, the techniques apply to other storage elements, such as latches.

Technical effects of the herein described systems and techniques include consideration, by processor 102, whether a clock-path delay to a node of PLD 200 is dependent on a clock-path delay to another node of PLD 200. Processor 102 considers levels of logic, such as a set of connections, that are used to implement clock paths to registers of PLD 200 to decide which clock-path connection delays to address. In addition, processor 102 also consider the clock-path connection delay requirements that can be achieved.

Although the foregoing present techniques and systems for determining beneficial clock-path connection delays have been described in detail by way of illustrations and examples for purposes of clarity and understanding, it will be recognized that the above described techniques and systems may be embodied in numerous other specific variations and embodiments without departing from the spirit or essential characteristics of the techniques and systems. Certain changes and modifications may be practiced, and it is understood that the techniques and systems for determining beneficial clock-path connection delays are not to be limited by the foregoing details, but rather is to be defined by the scope of claims.

What is claimed is:

1. A system for determining clock-path delay adjustments, said system comprising:
   a memory configured to store information; and
   a processor coupled to said memory and configured to:
   determine whether a first clock-path delay is adjustable independently of a second clock-path delay, wherein the first clock path delay is associated with a delay of a signal from a clock source to a first storage node, and the second clock path delay is associated with a delay of a signal from the clock source to a second storage node;
   determine an adjustment to apply to the first clock-path delay to improve data path timing if the first clock-path delay is adjustable independently of the second clock-path delay; and
   if the first clock-path delay is not adjustable independently of the second clock-path delay, determining a group of storage nodes with clock path delays that are dependent on one another, the group including the first and second storage nodes, and determining an adjustment to apply to a third clock-path delay if the first clock-path delay is not adjustable independently of the second clock-path delay, wherein the third clock path delay is associated with a delay of a signal from the clock source to the group of storage nodes.

2. A system in accordance with claim 1, wherein the first storage node includes a register and the second storage node includes a register, wherein the clock-path delays are implemented within an integrated circuit including a programmable logic device, a field programmable gate array, or an application specific integrated circuit.

3. A system in accordance with claim 1, wherein said processor is further configured to determine that the first clock-path delay is adjustable independently of the second clock-path delay by finding a first clock-path connection on the first clock path and a second clock-path connection on the second clock path, wherein the first and second clock-path connections are distinct from each other, wherein a change in a delay of the first clock-path connection does not affect a delay of the second clock-path, and a change in a delay of the second clock-path connection does not affect a delay of the first clock-path.

4. A system in accordance with claim 1, wherein said processor is further configured to determine the group of storage nodes with clock path delays that are dependent on one another by performing a backward traversal from a clock input of one of the first and second storage nodes until a variable delay clock-path connection is found and by determining that the first and second storage nodes are downstream of the variable delay clock-path connection.

5. A system in accordance with claim 4, wherein said processor is further configured to determine the group of storage nodes with clock path delays that are dependent on one another by first constraining a first of a set of variable delay clock path connections on the integrated circuit to change the first variable delay clock-path connections from a variable connection to a single-delay connection.

6. A system in accordance with claim 4, wherein said processor is further configured to determine a sub-group within the group of storage nodes with clock path delays that are dependent on one another by determining that a variable delay clock-path connection is found downstream of another variable delay clock-path connection.

7. A system in accordance with claim 1, wherein said processor is further configured to constrain the first and second clock paths so that a plurality of delay changes of the first and second clock paths are not independent from one another, wherein the first clock path is used to provide a clock signal to the first storage node and the second clock path is used to provide a clock signal to the second storage node.

8. A system in accordance with claim 1, wherein said processor is further configured to identify the group of storage nodes with clock path delays that are dependent on one another by searching for a dependency cycle in a dependency graph.

9. A system in accordance with claim 1, wherein said processor is further configured to:
constrain the first clock-path delay and the second clock-path delay so the first and second clock-path delays do not change independently to collapse long chains of dependencies; and
form a collection from a set of the nodes or groups associated with the respective clock paths.

10. A system in accordance with claim 1, wherein said processor is further configured to:
generate a timing graph including a plurality of annotated delays;
perform timing analysis based on the timing graph to compute a set of slacks on at least one edge of the timing graph, wherein the at least one edge represents a data-path connection;
determine a set of minimums from a set of fanin slacks for a plurality of inputs of the group, the collection, or the first storage node;
determine a set of minimums from a set of fanout slacks for a plurality of outputs of the group, the collection, or the first storage node; and
determine an adjustment to apply to a clock-path delay for the group of storage nodes or the first storage node based on the set of minimums of the fanin slacks and the set of minimums of the fanout slacks.

11. A system in accordance with claim 10, wherein said processor is further configured to determine an input or output slack of the group of storage nodes by performing a timing analysis after cutting timing paths between storage nodes within the group of storage nodes.

12. A system in accordance with claim 10, wherein said processor is further configured to:
determine an output slack of the group of storage nodes by performing a forward traversal from a node of the group of storage nodes, where the forward traversal function returns a different slack depending on whether a set of the nodes reached by performing the forward traversal are inside or outside the group of storage nodes; and
determine an input slack of the group of storage nodes by performing a backward traversal from a node of the group of storage nodes, where the backward traversal function returns a different slack depending on whether a set of the nodes reached by performing the backward traversal are inside or outside the group of storage nodes.

13. A system in accordance with claim 10, wherein said processor is further configured to determine an adjustment to apply to a clock-path delay for the group of storage nodes or the first storage node by computing an amount of clock-path delay adjustment needed to achieve balanced timing margin.

14. A system in accordance with claim 10, wherein said processor is further configured to determine a set of clock-path delay adjustments including a maximum clock-path delay adjustment for the group of storage nodes or the first storage node by computing an amount by which a clock-path delay can change before timing failures are created.

15. A system in accordance with claim 10, wherein said processor is further configured to determine a set of clock-path delay adjustments including a minimum clock-path delay adjustment for the group of storage nodes or the first storage node by computing an amount of an adjustment to a clock-path delay needed before a timing failure is resolved.

16. A system in accordance with claim 10, wherein said processor is further configured to determine a set of clock-path delay adjustments including a single clock-path delay adjustment for the group of storage nodes or the first storage node by computing an amount of an adjustment to a clock-path delay needed to achieve balanced timing margin and how much the clock-path delay can be adjusted before timing failures are created.

17. A system in accordance with claim 1, wherein said processor is further configured to execute a current iteration including:
receiving a timing graph including a plurality of annotated delays;
performing timing analysis based on the timing graph to compute a set of slacks on at least one edge of the timing graph, wherein the set of slacks includes a set of setup slacks and a set of hold slacks, wherein the at least one edge represents a data-path connection;

computing a set of clock-path delay adjustments for the group of storage nodes or the first storage node based on the set of setup slacks and the set of hold slacks;

updating a set of clock-path delay requirements of the timing graph based on the set of clock-path delay adjustments;

generating a set of clock-path connection delays by performing slack allocation based on the set of updated clock-path delay requirements; and updating the annotated delays based on the set of clock-path connection delays determined by slack allocation.

18. A system in accordance with claim 17, wherein said processor is further configured to determine whether to perform another iteration after the current iteration:

based on an iteration count at an end of the current iteration; or based on a magnitude of a set of the clock-path delay adjustments during the current iteration.

19. A system in accordance with claim 17, wherein said processor is further configured to operate only on the portion of the timing graph that has been affected by changes since an iteration preceding the current iteration.

20. A system in accordance with claim 10, wherein said processor is further configured to compute a set of clock-path delay adjustments based on restrictions on a maximum delay of each clock path or the longest clock path of an integrated circuit to bound path delay uncertainty created by process and operating condition variation.

21. A system in accordance with claim 17, wherein said processor is further configured to perform slack allocation for a portion of an integrated circuit based on a set of clock-path connection delay requirements, wherein the clock-path connection delay requirements are generated to bound connection delay uncertainty created by process and operating condition variation.

22. A system in accordance with claim 17, wherein said processor is further configured to perform slack allocation for a portion of an integrated circuit based on a set of clock-path connection delay requirements, wherein the clock-path connection delay requirements specify discrete delays that can be achieved.

23. A system in accordance with claim 22, wherein said processor is further configured to conform to clock-path connection delay requirements based on discrete delays during a set of later iterations of execution by quantizing delays to the nearest achievable delay or rounding down to the nearest achievable delay.

24. A system in accordance with claim 17, wherein said processor is further configured to perform slack allocation for a portion of an integrated circuit based on a set of clock-path connection delay requirements, wherein the clock-path connection delay requirements specify ranges of delays that can be achieved.

25. A system in accordance with claim 17, wherein said processor is further configured to perform slack allocation by using weights to guide toward solutions that satisfy minimum requirements while enforcing maximum requirements.

26. A system in accordance with claim 17, wherein said processor is further configured to perform slack allocation so that relative clock-path delays of the first and second storage nodes in the collection are preserved by modifying the clock-path delays after each slack-allocation iteration.

27. A system in accordance with claim 17, wherein said processor is further configured to perform slack allocation so that relative clock-path delays of the first and second storage nodes in the collection are preserved by modifying a timing graph to have a common variable clock-path connection and constraining a first clock-path connection delay and a second clock-path connection delay.

28. At least one computer readable storage medium having computer program instructions stored thereon that when executed by a processor implements a method comprising:

determining whether a first clock-path delay is adjustable independently of a second clock-path delay, wherein the first clock path delay is associated with a delay of a signal from a clock source to a first storage node, and the second clock path delay is associated with a delay of a signal from the clock source to a second storage node; and determining an adjustment to apply to the first clock-path delay to improve data path timing if the first clock-path delay is adjustable independently of the second clock-path delay; and if the first clock-path delay is not adjustable independently of the second clock-path delay, determining a group of storage nodes with clock path delays that are dependent on one another, the group including the first and second storage nodes, and determining an adjustment to apply to a third clock-path delay if the first clock-path delay is not adjustable independently of the second clock-path delay, wherein the third clock path delay is associated with a delay of a signal from a clock source to the group of storage nodes.

29. At least one computer readable storage medium in accordance with claim 28, wherein the first storage node includes a register and the second storage node includes a register, wherein the integrated circuit includes a programmable logic device, a field programmable gate array, or an application specific integrated circuit.

30. At least one computer readable storage medium in accordance with claim 28, wherein the determination that the first clock-path delay is adjustable independently of the second clock-path delay is made by finding a first clock-path connection on the first clock path and a second clock-path connection on the second clock path, wherein the first and second clock-path connections are distinct from each other, wherein a change in a delay of the first clock-path connection does not affect a delay of the second clock-path, and a change in a delay of the second clock-path connection does not affect a delay of the first clock-path.

31. At least one computer readable storage medium in accordance with claim 28, wherein the group of storage nodes which have clock path delays that are dependent on one another is determined by performing a backward traversal from a clock input of one of the first and second storage nodes until a variable delay clock-path connection is found and by determining that the first and second storage nodes are downstream of the variable delay clock-path connection.

32. At least one computer readable storage medium in accordance with claim 28, wherein the computer program instructions are further arranged to constrain the first and second clock paths so that a plurality of delay changes of the first and second clock paths are not independent, wherein the first clock path is used to provide a clock signal to the first storage node and the second clock path is used to provide a clock signal to the second storage node.

33. At least one computer readable storage medium in accordance with claim 28, wherein the computer program instructions are further arranged to identify the group of storage nodes by searching for a dependency cycle in a dependency graph.

34. A method for determining clock-path delay adjustments, said method comprising:

determining, at a computing device, whether a first clock-path delay is adjustable independently of a second clock-path delay, wherein the first clock path delay is associated with a delay of a signal from a clock source to a first storage node, and the second clock path delay is associated with a delay of a signal from the clock source to a second storage node; and if the first clock-path delay is not adjustable independently of the second clock-path delay, determining a group of storage nodes with clock path delays that are dependent on one another, the group including the first and second storage nodes, and determining an adjustment to apply to a third clock-path delay if the first clock-path delay is not adjustable independently of the second clock-path delay, wherein the third clock path delay is associated with a delay of a signal from the clock source to the group of storage nodes.

35. A method in accordance with claim 34, wherein the first storage node includes a register and the second storage node includes a register, wherein the clock-path delays are implemented within an integrated circuit including a programmable logic device, a field programmable gate array, or an application specific integrated circuit.

36. A method in accordance with claim 34, wherein said determining that the first clock-path delay is not adjustable independently of the second clock-path delay is performed by finding a first clock-path connection on the first clock path and a second clock-path connection on the second clock path, wherein the first and second clock-path connections are distinct from each other, wherein a change in a delay of the first clock-path connection affects a delay of the second clock-path, and a change in a delay of the second clock-path connection affects a delay of the first clock-path.

37. A method in accordance with claim 34, further comprising determining the group of storage nodes with clock path delays that are dependent on one another by performing a backward traversal from a clock input of one of the first and second storage nodes until a variable delay clock-path connection is found and by determining that the first and second storage nodes are downstream of the variable delay clock-path connection.

38. A method in accordance with claim 34, further comprising constraining the first and second clock paths so that a plurality of delay changes of the first and second clock paths are not independent, wherein the first clock path is used to provide a clock signal to the first storage node and the second clock path is used to provide a clock signal to the second storage node.

39. At least one computer readable storage medium in accordance with claim 28, wherein the computer program instructions are further arranged to identify the group of storage nodes with clock path delays that are dependent on one another by searching for a dependency cycle in a dependency graph.

* * * * *